(12) United States Patent
Lee et al.

(10) Patent No.: US 11,556,354 B2
(45) Date of Patent: Jan. 17, 2023

(54) CONTEXT-BASED USER-PERSONALIZED CONFIGURATION METHOD AND DEVICE

(71) Applicant: Samsung Electronics Co., Ltd., Gyeonggi-do (KR)

(72) Inventors: Hwajun Lee, Gyeonggi-do (KR); Wansoo Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/427,683

(22) PCT Filed: Jan. 29, 2020

(86) PCT No.: PCT/KR2020/001329
§ 371 (c)(1),
(2) Date: Aug. 2, 2021

(87) PCT Pub. No.: WO2020/159213
PCT Pub. Date: Aug. 6, 2020

(65) Prior Publication Data
US 2022/0129282 A1    Apr. 28, 2022

(30) Foreign Application Priority Data
Feb. 1, 2019 (KR) .......... 10-2019-0013827

(51) Int. Cl.
*G06F 3/048* (2013.01)
*G06F 9/445* (2018.01)
*G06F 9/451* (2018.01)
*G06F 3/04842* (2022.01)

(52) U.S. Cl.
CPC ........ *G06F 9/4451* (2013.01); *G06F 3/04842* (2013.01); *G06F 9/451* (2018.02)

(58) Field of Classification Search
CPC ..... G06F 9/4451; G06F 9/451; G06F 3/04842
See application file for complete search history.

(56) References Cited

U.S. PATENT DOCUMENTS

| | | | |
|---|---|---|---|
| 2005/0091674 A1 | 4/2005 | Knight et al. | |
| 2009/0222761 A1* | 9/2009 | Hayashi | G06F 9/451 715/781 |
| 2010/0131443 A1 | 5/2010 | Agarwal et al. | |
| 2010/0217672 A1 | 8/2010 | Maeno | |
| 2010/0317371 A1* | 12/2010 | Westerinen | H04W 4/029 455/456.6 |

(Continued)

FOREIGN PATENT DOCUMENTS

| | | |
|---|---|---|
| JP | 2009-77019 A | 4/2009 |
| JP | 5189768 B2 | 4/2013 |

(Continued)

*Primary Examiner* — Mahelet Shiberou
(74) *Attorney, Agent, or Firm* — Cha & Reiter, LLC

(57) ABSTRACT

Various embodiments of the present invention provide a method and a device comprising a memory and a processor, wherein the processor is configured to: identify a context on the basis of at least one of a time, a location, and a use pattern; provide a notification associated with the identified context; detect a user input for selecting the provided notification; and provide recommendation information or configuration information associated with the context. Various embodiments are possible.

11 Claims, 23 Drawing Sheets

(56) References Cited

U.S. PATENT DOCUMENTS

| | | | | |
|---|---|---|---|---|
| 2012/0115453 A1* | 5/2012 | Zheng | .................. | H04W 4/185 |
| | | | | 455/418 |
| 2013/0346347 A1* | 12/2013 | Patterson | .......... | H04M 1/72454 |
| | | | | 706/12 |
| 2014/0201675 A1* | 7/2014 | Joo | .................... | G06Q 30/0267 |
| | | | | 715/781 |
| 2015/0127466 A1* | 5/2015 | Zhu | .................... | G06Q 30/0254 |
| | | | | 705/14.66 |
| 2016/0142407 A1 | 5/2016 | Chun et al. | | |
| 2016/0255188 A1* | 9/2016 | Chaudhri | .............. | G06F 3/0484 |
| | | | | 715/728 |
| 2017/0154326 A1 | 6/2017 | Jo et al. | | |
| 2017/0261954 A1 | 9/2017 | Li et al. | | |
| 2019/0342447 A1* | 11/2019 | Ko | ...................... | H04M 1/7243 |

FOREIGN PATENT DOCUMENTS

| | | |
|---|---|---|
| KR | 10-2011-0100236 A | 9/2011 |
| KR | 10-2012-0052580 A | 5/2012 |
| KR | 10-2014-0044659 A | 4/2014 |
| KR | 10-2014-0133132 A | 11/2014 |
| KR | 10-2016-0004164 A | 1/2016 |
| KR | 10-2016-0057837 A | 5/2016 |
| KR | 10-2017-0104953 A | 9/2017 |
| KR | 10-1835344 B1 | 4/2018 |
| KR | 10-2018-0120468 A | 11/2018 |

\* cited by examiner

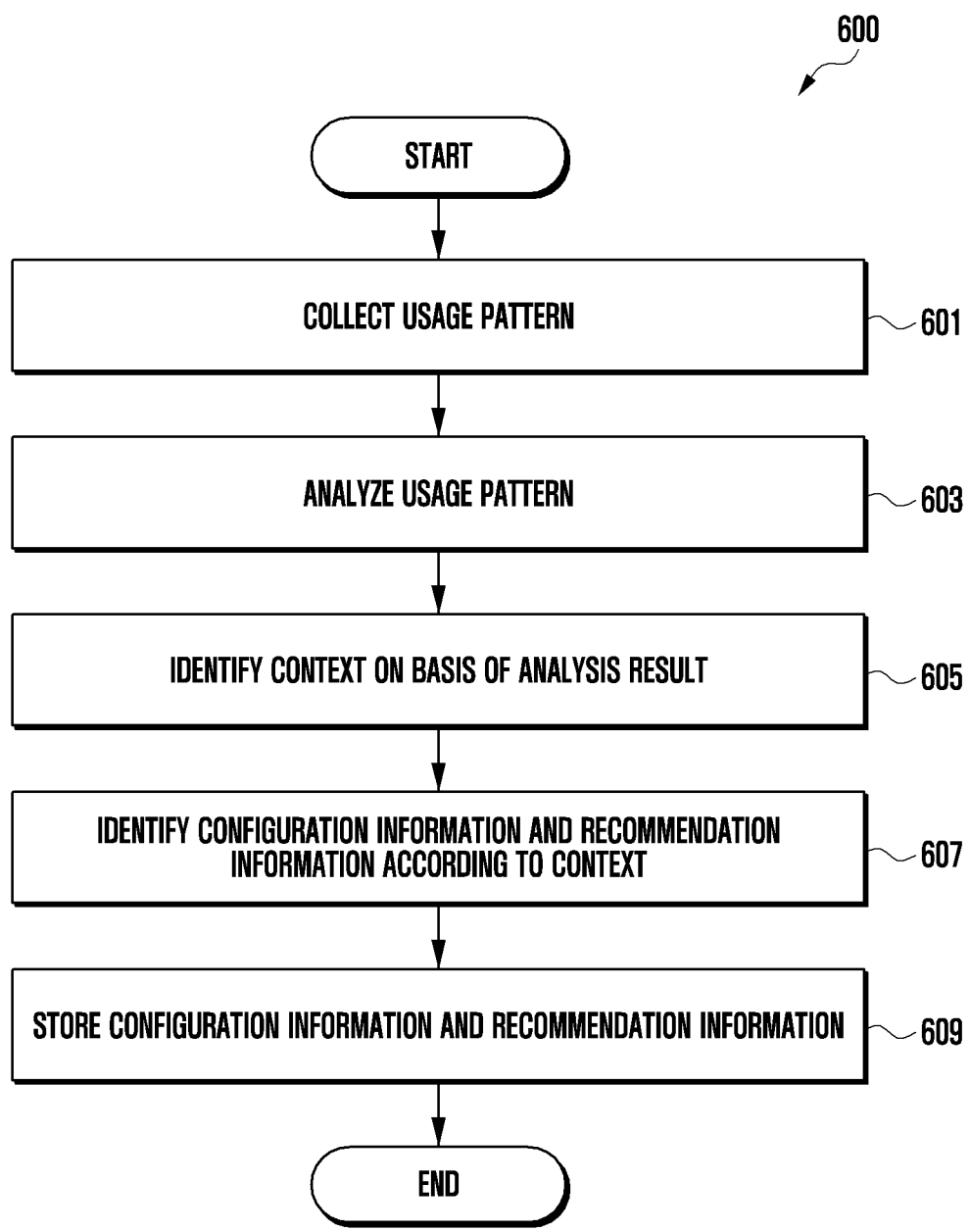

CONTEXT-BASED USER-PERSONALIZED CONFIGURATION METHOD AND DEVICE

CROSS REFERENCE TO RELATED APPLICATIONS

This application is a National Phase Entry of PCT International Application No. PCT/KR2020/001329, which was filed on Jan. 29, 2020, and claims a priority to Korean Patent Application No. 10-2019-0013827, which was filed on Feb. 1, 2019, the contents of which are incorporated herein by reference.

TECHNICAL FIELD

Various embodiments of the disclosure relate to a context-based user customized configuration method and device.

BACKGROUND

With the development of digital technology, various types of electronic devices such as mobile communication terminals, personal digital assistants (PDAs), electronic notebooks, smart phones, tablet personal computers (PCs), and wearable devices have become widely used. In order to support and increase functions of the electronic device, the hardware and/or the software components of the electronic device are continuously improving.

For example, the electronic device may provide a customized function suitable for a user based on the user's usage history of the electronic device. For example, the electronic device may determine a context (e.g., at home, at work, before going to bed, etc.) based on a time or location, and may provide a function (e.g., a content playback application) useful for the context. Since the usage pattern is different for each user, each user may have a different recommended function depending on the context. The electronic device may improve user convenience by providing a different function for each user.

SUMMARY

In certain embodiments, a method and device are disclosed for identifying a user context based on the use pattern of the electronic device, and providing configuration information and recommendation information in response to the identified context.

Solution to Problem

An electronic device according to various embodiments of the disclosure may include: a memory; and a processor, wherein the processor may be configured to: identify a context on the basis of at least one of time, a location, or a usage pattern; provide a notification associated with the identified situation; detect a user input for selecting the provided notification; and provide configuration information and recommendation information associated with the context.

A method of operating an electronic device, the method including: identifying a context on the basis of at least one of a time, a location, or a use pattern; providing a notification associated with the identified context; detecting a user input for selecting the provided notification; and providing configuration information and recommendation information associated with the context.

According to certain embodiments, a context may be identified on the basis of a usage pattern of an electronic device, and configuration information and recommendation information of the electronic device may be provided in response to the identified context.

According to certain embodiments, the usage pattern of an electronic device may be monitored and analyzed to identify a context, thereby automatically changing the configuration of the electronic device or providing an application which is mainly used by a user, according to the context.

According to certain embodiments, the configuration of an electronic device may be automatically changed according to a context or an application which is mainly used by a user may be provided in the form of widget, thereby improving user convenience.

BRIEF DESCRIPTION OF DRAWINGS

FIG. 6 is a flowchart illustrating a method of identifying user customized information on the basis of a usage pattern in an electronic device according to certain embodiments of the disclosure.

DETAILED DESCRIPTION

Figure 1:
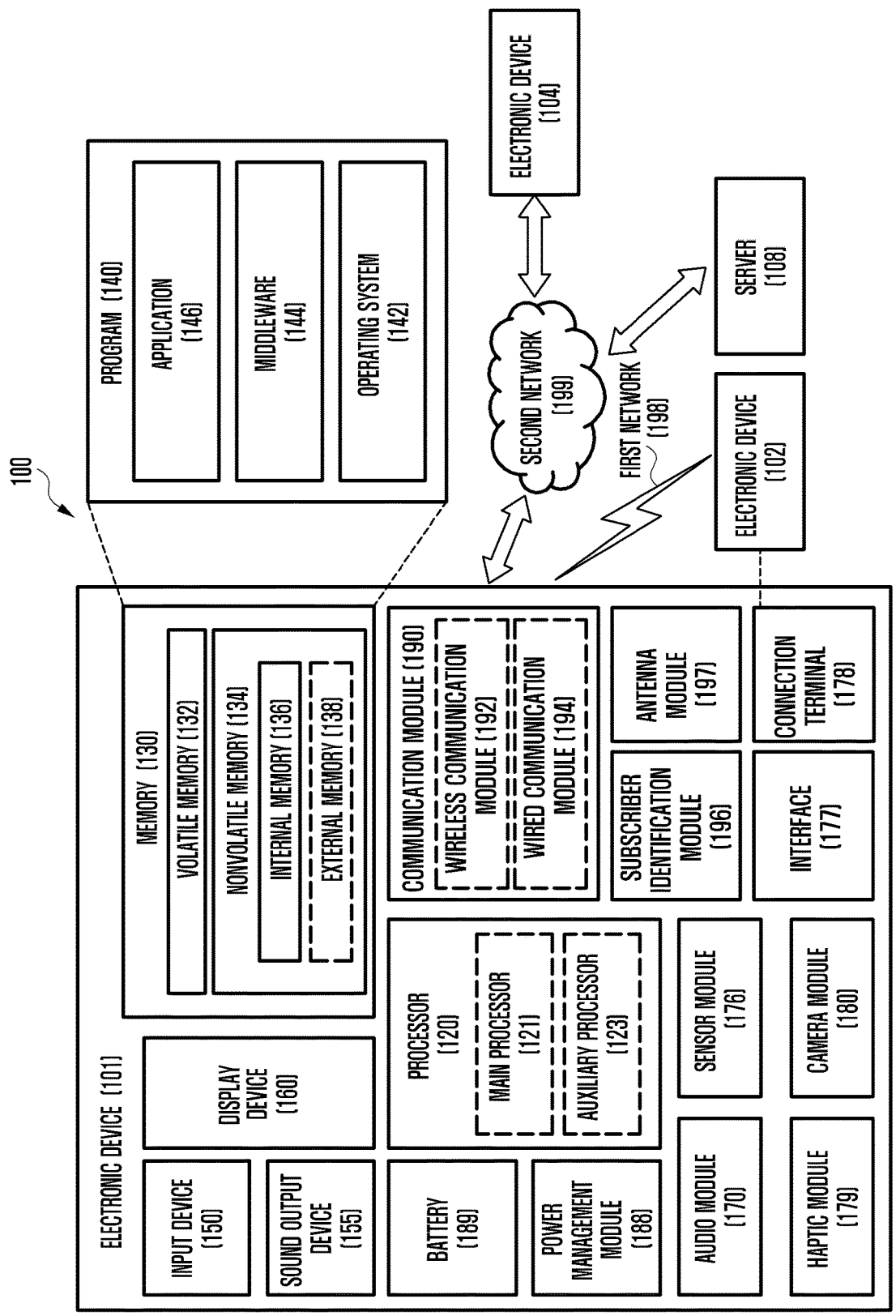
FIG. 1 is a block diagram illustrating an electronic device 101 in a network environment 100 according to certain embodiments of the disclosure.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) according to certain embodiments of the disclosure may include a memory (e.g., the memory 130 of FIG. 1) and a processor (e.g., the processor 120 of FIG. 1), such that the processor may be configured to: identify a context on the basis of at least one of time, a location, or a usage pattern; provide a notification associated with the identified context; detect a user input for selecting the provided notification; and provide configuration information or recommendation information associated with the context.

The processor may be configured to overlap and configure at least two contexts on the basis of the usage pattern or a user's configuration.

The processor may be configured to change the configuration of the electronic device on the basis of the configuration information associated with the identified context.

The processor may be configured to change the widget of the electronic device on the basis of the recommendation information associated with the identified context.

The processor may be configured to: provide configuration information obtained by changing the configuration of the electronic device on the basis of the usage pattern when the usage pattern is analyzed; and provide configuration information configured as a default of the electronic device when the usage pattern is not analyzed.

The processor may be configured to: change the configuration information or the recommendation information on the basis of a user input for changing information; and store the changed configuration information or the changed recommendation information in the memory.

The processor may be configured to change the stored configuration information or the stored recommendation information on the basis of the usage pattern.

The processor may be configured to: collect the usage patterns on the basis of a usage tendency of the electronic device; analyze the collected usage patterns; and use the analysis result to identify the context.

The usage pattern may be configured to include at least one of time, a date, a day of the week, a location, or an application using the electronic device.

The processor may be configured to collect usage patterns of an external electronic device connected to the electronic device as the usage patterns of the electronic device.

The processor may be configured to control the external electronic device on the basis of the configuration information associated with the identified context.

Figure 2:
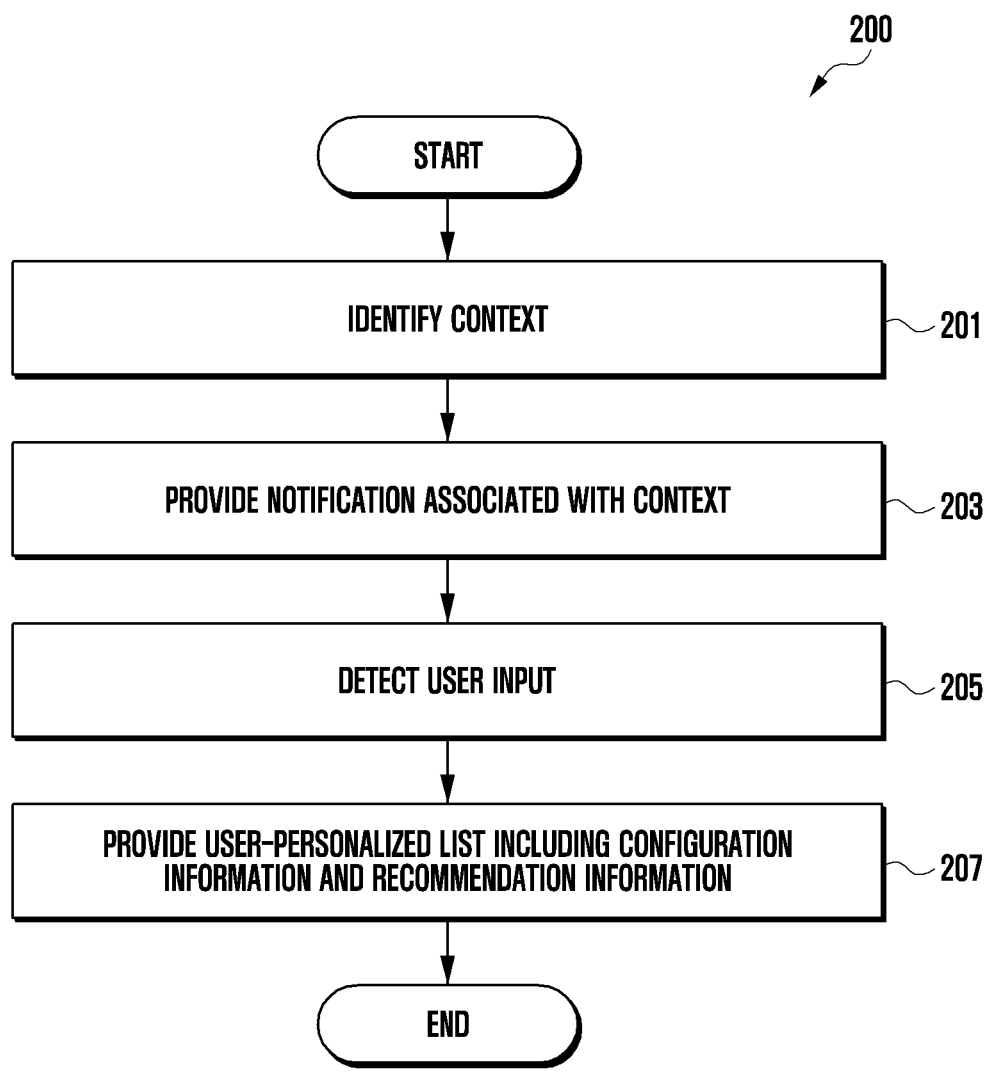
FIG. 2 is a flowchart illustrating a method of providing user customized information based on a context in an electronic device according to certain embodiments of the disclosure.

FIG. 2 is a flowchart illustrating a method of providing user customized information based on a context in an electronic device according to certain embodiments of the disclosure.

Referring to FIG. 2, in operation 201, a processor (e.g., the processor 120 of FIG. 1) of an electronic device (e.g., the electronic device 101 of FIG. 1) may identify a context.$_{[ejc1]}$ The processor 120 may identify the context on the basis of at least one of time (e.g., current time), a location (e.g., a current location), or a usage pattern. The context (or condition) may refer to a current state of a user using the electronic device 101. For example, the context may include at least one of wake-up, home, work, go to bed, sleeping, driving, or overseas trip. Alternatively, the situation may further include at least one of commuting, head home, school, charging, meeting, work out, battery saving, auto rotation, or execution of a specific application. The processor 101 may identify the context on the basis of a usage pattern (e.g., at least one of time {e.g., current time}, a date, a day of the week, a location, or an application).

According to certain embodiments, there may be one or more identified contexts. One or more of the contexts may be "overlapped and configured according to the user's configuration or the usage pattern of the electronic device 101. For example, at least two different contexts such as sleep and power saving, or home and charging may be set. According to certain embodiments, the processor 120 may configure the context based on the configuration of the electronic device 101 and the user's configuration. The configuration of the electronic device 101 may indicate that a context is configured based on the usage pattern (i.e., or usage tendency) of the electronic device 101. The user's configuration may mean that a context is configured on the basis of a user input. A specific example of configuring the context will be described with reference to the drawings below.

In operation 203, the processor 120 may provide a notification associated with the identified context. The notification may indicate to the user the existence of a currently identified context. The notification may be generated using at least one of text, an image, or a video. For example, when the electronic device 101 is in a lock mode, the processor 120 may provide a notification in the form of a bar or an icon, based on a notification method configured in the electronic device 101. When the electronic device 101 is not in the lock mode, the processor 120 may provide (e.g., display) the notification at the top of a display (e.g., the display device 160) for a predetermined period of time (e.g., one second or three seconds), and may omit provision of (e.g., remove the display) the notification after the predetermined period of time has elapsed. The notification may be provided through a speaker (e.g., the sound output device 155) or vibration (e.g., the haptic module 179) according to the configuration of the electronic device 101.

In operation 205, the processor 120 may detect a user input. The user input may be to select the provided notification. The processor 120 may detect a user input for selecting (e.g., touching) a notification associated with the context displayed on the display device 160. Alternatively, the processor 120 may provide a notification list responsive to detecting user input dragged from the upper bezel of the electronic device 101 to the display device 160, and may detect the user input for selecting the notification associated with the context from the notification list. The notification list may include notifications that the user has not yet seen.

In operation 207, the processor may provide a user customized list, including configuration information and recommendation information. The processor 120 may execute an application (e.g., a routine application) associated with the context, based on the detection of the user input selecting the notification associated with the context. The processor 120 may provide the user customized list through the executed application associated with the context. The user customized list may include configuration information and recommendation information corresponding to the identified context, and may be different for each user. The configuration information may be indicative of changes to the configuration of the electronic device 101. For example, the configuration information may configure (or change) options (e.g., on/off, sound/vibration/silent, hide/show, etc.) related to the action of the electronic device 101 according to the identified context.

TABLE 1

| | Actions | Options |
|---|---|---|
| Connections | Airplane mode | On/Off |
| | Wi-Fi | On/Off |
| | Bluetooth | On/Off |
| | NFC | On/Off |
| | Location | On/Off |
| | Mobile Hotspot | On/Off |
| | Mobile data | On/Off |
| Sound | Sound | On/Off |
| | Vibration | On/Off |
| | Silent | On/Off |
| | Dolby Atmos | On/Off |
| | Keyboard sound | On/Off |
| | Keyboard vibration | On/Off |
| | Separate app sound | On/Off |
| Display | Blue light filter | On/Off |
| | Brightness | 0 to 100% |
| | Color adjustment | On/Off |
| | Font size | Tiny~Extra huge |
| | Hide navigation bar | Show/Hide |

TABLE 1-continued

| | Actions | Options |
|---|---|---|
| | Screen orientation | Auto-rotate/Portrait/Landscape |
| | Screen resolution | HD+/FHD+/WQHD+ |
| | Screen timeout | 15 sec/30 sec/1 min/2 min/5 min/10 min |
| | Screen zoom | Small/Normal/Large |
| | Turn on Edge lighting | |
| | Night mode | On/Off |
| Battery | Power mode | High performance/Optimized/Medium/Maximum |
| Lock screen | Always On Display | On/Off |
| | Unlock phone | On/Off |
| | Lock instantly with power key | On/Off |
| Dashboard | Dashboard widgets | |
| Voice Call | Voice wake-up | On/Off |
| Cloud accounts | Auto sync | On/Off |
| Device control | Turn on Flashlight | On/Off |
| | Tap button | Home/Back/Recents |
| | Pay on Lock screen | On/Off |
| | Outgoing international call lock | On/Off |

Table 1 shows the options related to the action of the electronic device 101. The action may include at least one of connections, sound, display, battery, lock screen, dashboard, voice wake-up, cloud accounts, or device control. The above actions are only described to help the understanding of the disclosure, and may further include other actions not included in Table 1.

Referring to Table 1, when the context is "home", the configuration information may refer to configuring to "on" for Wi-Fi, "off" for Bluetooth, or "on" for sound. When the configuration is "work", the configuration information may refer to configuring to "on" for Wi-Fi, "on" for Bluetooth, or "on" for vibration. When the configuration is "sleep", the configuration information may refer to configuring to "off" for Wi-Fi, "off" for Bluetooth, "on" for silence, and "on" for blue light filter.

The recommendation information may relate to an application recommended to a user. For example, the recommendation information may be to configure a recommendation application to be included in the widget of the electronic device 101 according to the identified context. When the context is "home", the recommendation information may be to configure a weather application or a news application to be included in the widget of the electronic device 101. For example, the processor 120 may configure a location for the weather application as a geographic location corresponding to "home" on the basis of the context. Alternatively, the processor 120 may configure the news application as a frequently viewed news category (e.g., news from the first broadcaster).

When the context is "work", the recommendation information may be to configure at least one of a messenger application, an Internet application, or a stock application to be included in the widget of the electronic device 101. For example, the processor 120 may configure the web page of the Internet application as a web page frequently visited by the user at work on the basis of the context. The processor 120 may configure the stock application as a page for the first stock on the basis of the context. When the recommendation application is included in the widget of the electronic device 101, the user may execute the recommendation application through the widget configured on the home screen of the electronic device 101.

According to certain embodiments, the processor 120 may change the configuration information or the recommendation information on the basis of a user input. The processor 120 may store the changed configuration information or the changed recommendation information in a memory (e.g., the memory 130 of FIG. 1). When the context is identified after being stored in the memory 130, the processor 120 may change the configuration of the electronic device 101 according to the configuration information stored in the memory 130, and may change the widget of the electronic device 101 according to the recommendation information stored in the memory 130. The processor 120 may monitor whether the identified context is ended or whether the configuration is changed. When the identified context ends, the processor 120 may restore the configuration information of the electronic device 101, which is changed in response to the context, to the previous configuration information. When the context is changed, the processor 120 may change the configuration of the electronic device 101 in response to the changed context, and may change the widget of the electronic device 101 according to the recommendation information corresponding to the changed context. The widget of the electronic device 101 may be restored to the recommendation information.

FIGS. 3A to 3D are diagrams illustrating an example of a user interface including user customized information according to certain embodiments of the disclosure.

Figure 3A:
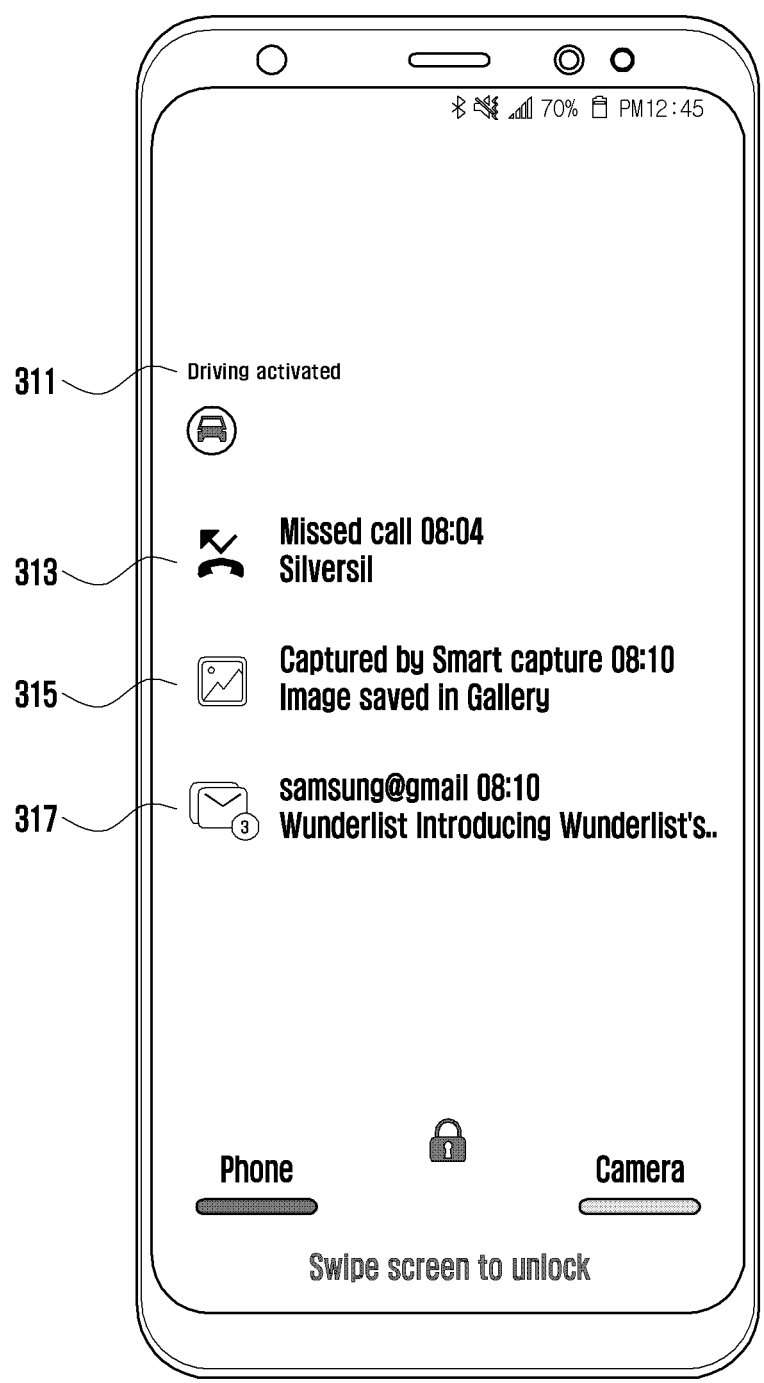
FIGS. 3A to 3D are diagrams illustrating an example of a user interface including user customized information according to certain embodiments of the disclosure.

FIG. 3A illustrates a user interface including a notification associated with a context according to certain embodiments.

Referring to FIG. 3A, a processor (e.g., the processor 120 of FIG. 1) of an electronic device (e.g., the electronic device 101 of FIG. 1) according to certain embodiments may provide a user interface 310 including a notification (e.g., a first notification 311) associated with a context, when the context is identified. The first user interface 310 is an example of a lock screen of the electronic device 101 and may include various notifications (or notification information). The first notification 311 is a notification associated with the currently identified context, and may be provided when the context is identified as "driving". The processor 120 may identify the context as "driving" on the basis of at least one of time (e.g., current time), a date, a day of the week, a location, or a usage pattern, and may provide a notification associated with "driving". A second notification 313 indicates that there is a missed call, a third notification 315 indicates that a captured image is stored, and a fourth notification 317 indicates that mail has been received at a user account configured in the electronic device 101.

Figure 3B:
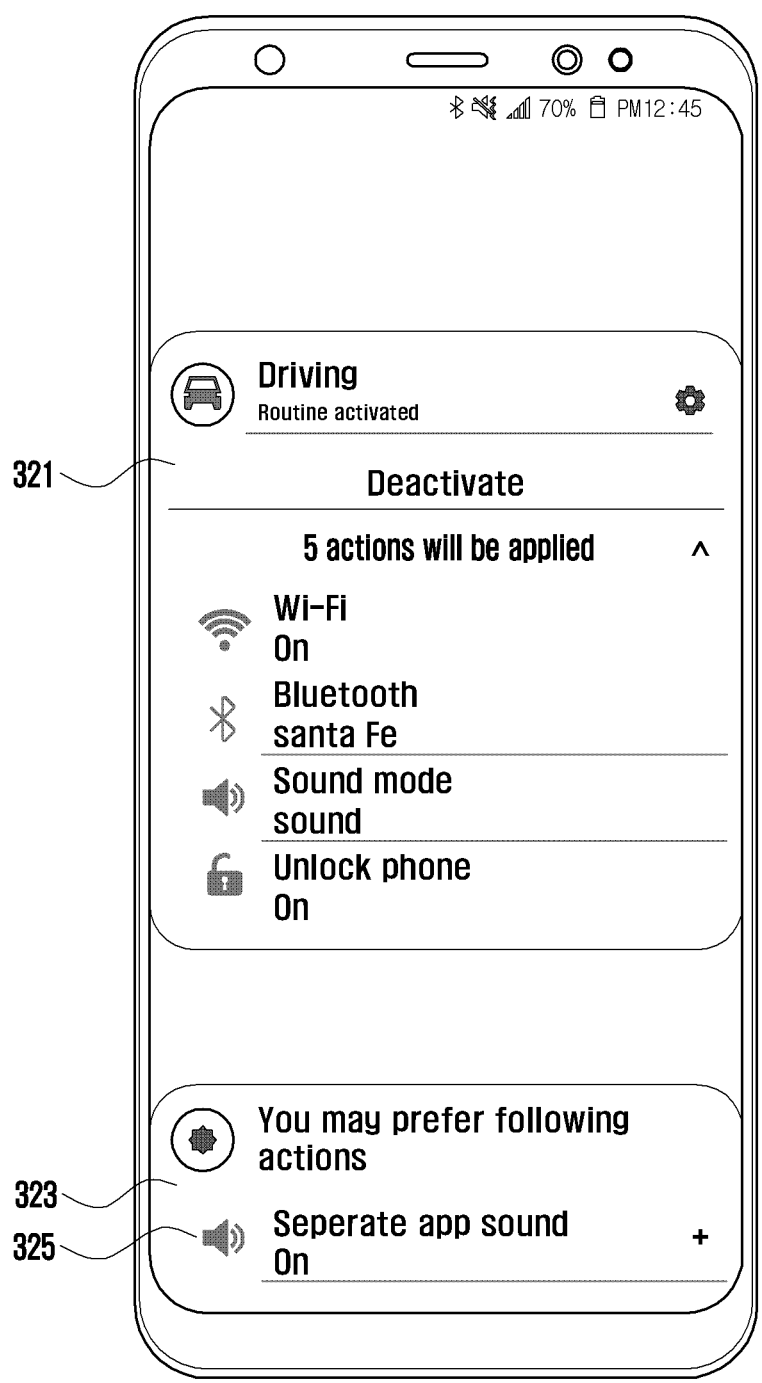

FIG. 3B illustrates a user interface including a user customized list according to certain embodiments.

Referring to FIG. 3B, the processor 120 may provide a second user interface 320 on the basis of a user input for selecting the first notification 311 from the first user interface 310. The second user interface 320 may include configuration information associated with the "driving" context. The configuration information may include registered (or predetermined) configuration information 321 or recommendation configuration information 323. When a context is "driving", the registered configuration information 321 may include connecting to a vehicle configured by turning "on" Wi-Fi and turning "on" Bluetooth, turning "on" sound, and turning "on" the electronic device 101 to unlock the electronic device 101. It is noted that the number of discrete recommendation setting configuration information 323 may be singular or plural. The recommendation configuration information 323 in the second user interface 320 may include first recommendation configuration information 325. The first recommendation configuration information 325 may recommend one or more configurations that may be useful to the user when the context is "driving," on the basis of the usage pattern of the electronic device 101. For example, the first recommendation configuration information 325 may include a configuration of activating different sound cues for each application.

Figure 3C:
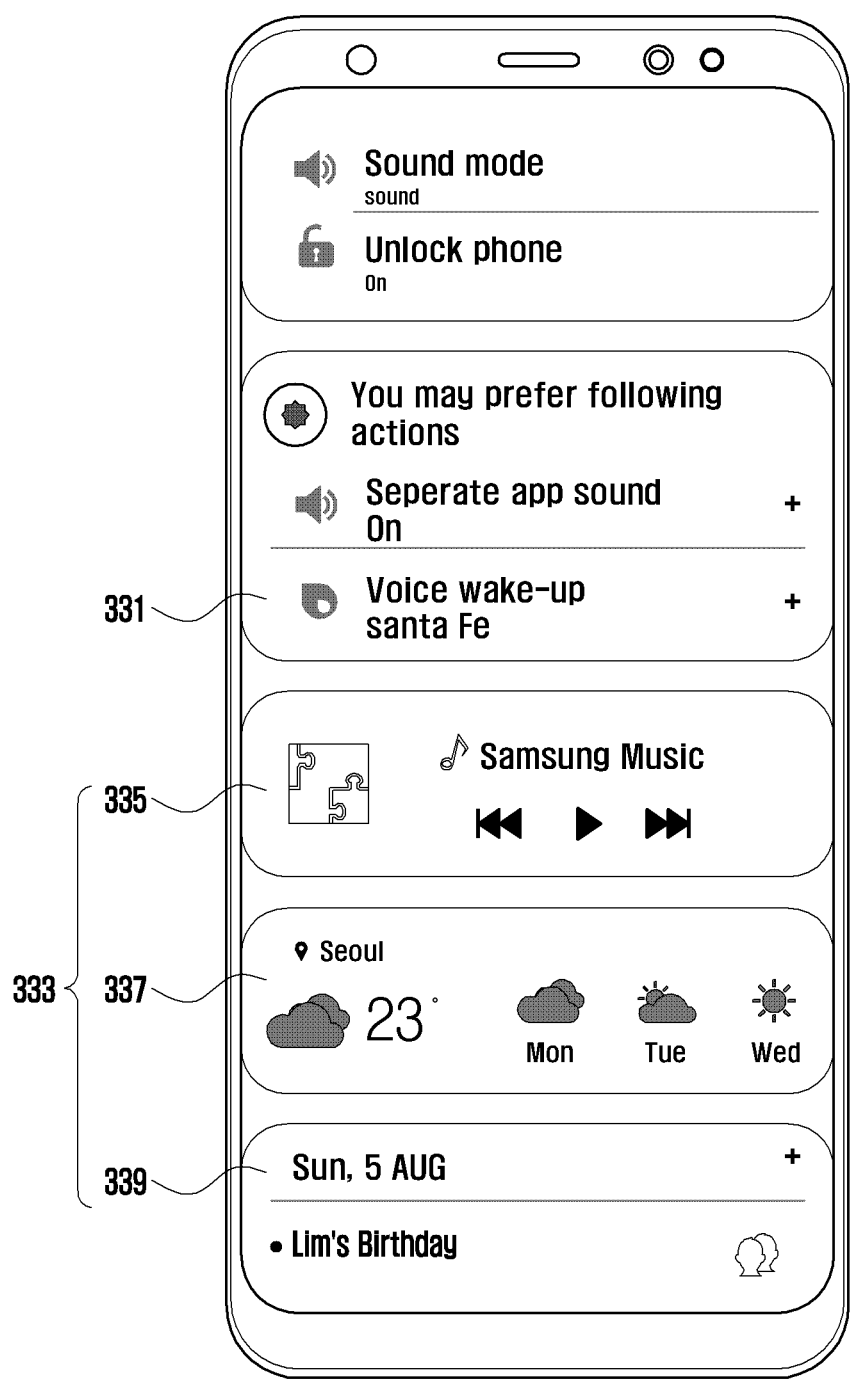

FIG. 3C illustrates a user interface including a user customized list according to certain embodiments.

Referring to FIG. 3C, the processor 120 may provide a third user interface 330 responsive to receiving a scroll input (e.g., an input of dragging a corresponding screen down) in the second user interface 320. The third user interface 330 may include second recommendation configuration information 331 and further recommendation information 333. The second recommendation configuration information 331 suggest activating voice-enabled wake-up of the electronic device$_{[RH2]}$. The recommendation information 333 may include at least one of a first recommendation widget information 335, a second recommendation widget information 337, and a third recommendation widget information 339. The first recommendation widget information 335 may add a music application to the widget of the electronic device 101. When the usage pattern is analyzed, the processor 120 may include frequently played music or recently played music to a playlist of the music application. When the usage pattern is not analyzed, the processor 120 may allow music (or music files) stored in a memory (e.g., the memory 130) or recently played music to be included in the playlist of the music application.

The second recommendation widget information 357 may add a weather application to the widget of the electronic device 101. When the usage pattern is analyzed, the processor 120 provide weather information corresponding to a known location (e.g., home or work) associated with the user. When the usage pattern is not analyzed, the processor 120 may provide weather corresponding to the current location. For example, when the context is recognized as "driving" and "commuting", the processor 120 may provide updated weather for each changed location from the current location to a work location, or may provide weather information corresponding to the work location. The third recommendation widget information 339 may add a calendar application to the widget of the electronic device 101. The processor 120 may provide a schedule corresponding to the current date.

Figure 3D:
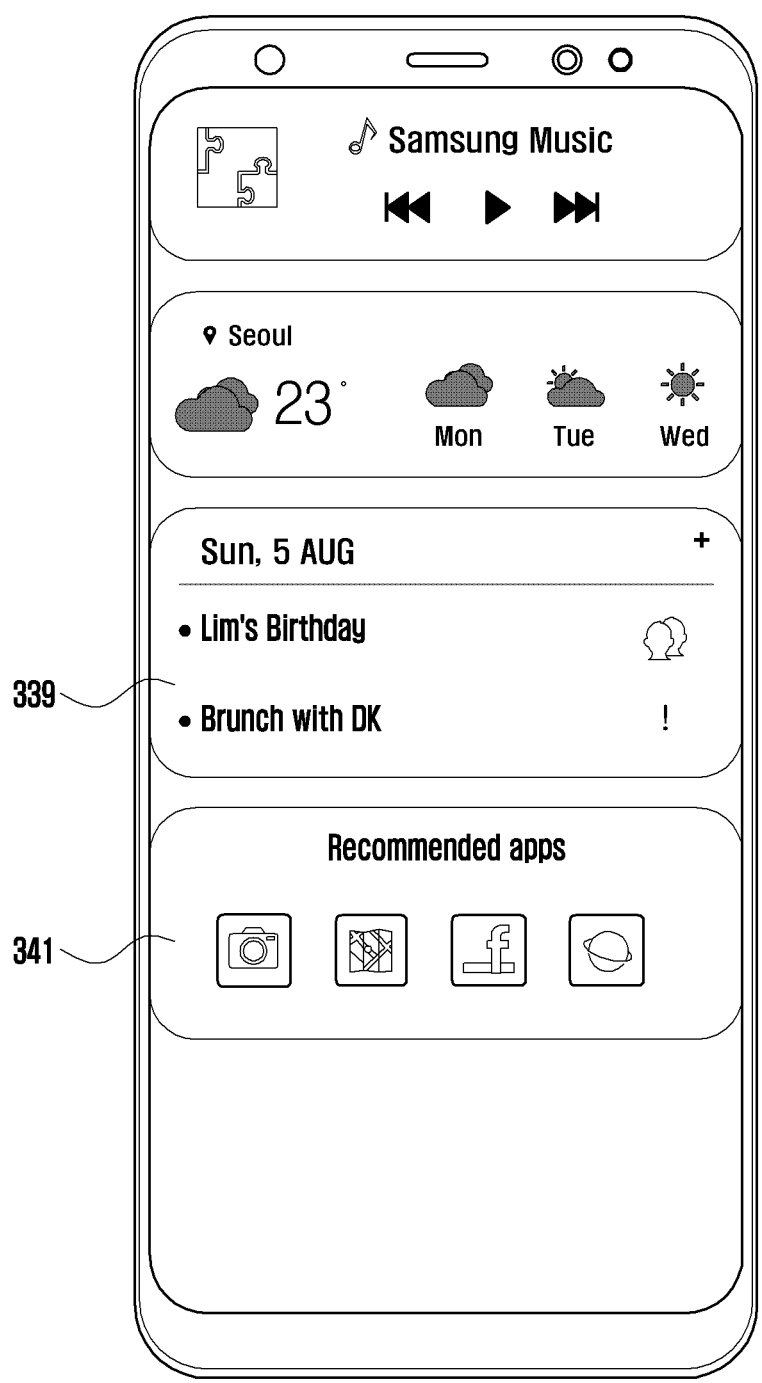

FIG. 3D illustrates a user interface including a user customized list according to certain embodiments.

Referring to FIG. 3D, the processor 120 may provide a fourth user interface 340 responsive to receiving a scroll input (e.g., an downwards drag input) to the third user interface 330. The fourth user interface 330 may include the third recommendation widget information 339 or a recommenced application list 341. The recommendation application list 341 may include an image corresponding to at least one application. The processor 120 may allow an application not included in the recommendation widget information to be included in the recommendation application list 341 based on the context.

Figure 4:
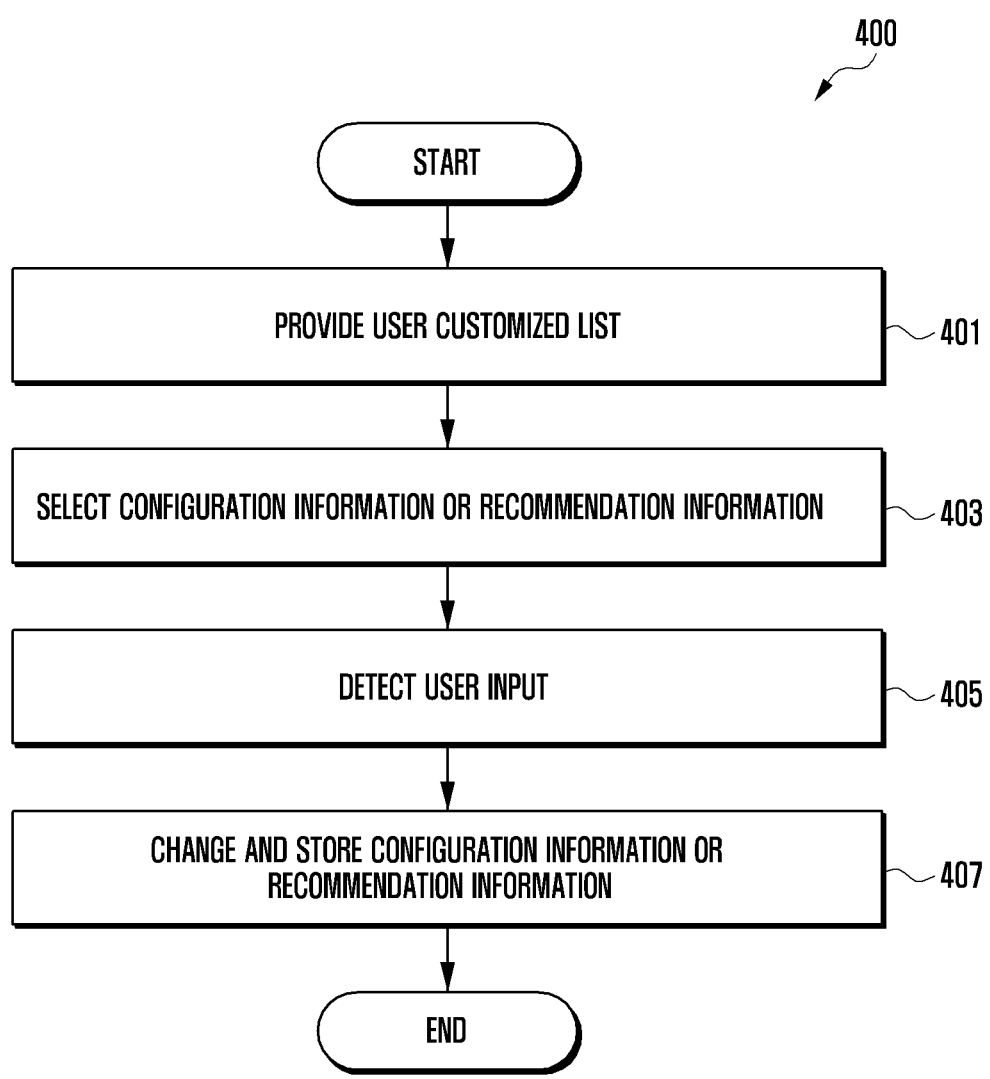
FIG. 4 is a flowchart illustrating a method of configuring user customized information in an electronic device according to certain embodiments of the disclosure.

FIG. 4 is a flowchart illustrating a method of configuring user customized information in an electronic device according to certain embodiments.

Referring to FIG. 4, in operation 401, a processor (e.g., the processor 120 of FIG. 1) of an electronic device (e.g., the electronic device 101 of FIG. 1) according to certain embodiments may provide a user customized list. The user customized list may include at least one piece of configuration information or at least one piece of recommendation information. The configuration information may be set to change the configuration of the electronic device 101. The recommendation information may cause a recommendation application to be included in the widget of the electronic device 101. The processor 120 may provide the user customized list on the basis of the user input for selecting the notification associated with the context as shown in FIG. 3A.

According to certain embodiments, the processor 120 may provide a user interface (e.g., the second user interface 320 of FIG. 3B) including a user customized list corresponding to a context associated with a notification. Alternatively, the processor 120 may execute an application associated with the context and may provide the user customized list on the basis of a user input for selecting at least one context in the executed application. The processor 120 may execute the application associated with the context on the basis of a user input for selecting an icon of the application associated with the context on the home screen. The processor 120 may provide a user customized list corresponding to a context selected by the user input.

In operation 403, the processor 120 may select the configuration information or the recommendation information to be displayed. The configuration information may include at least one piece of registered configuration information or recommendation configuration information. The registered configuration information may be preconfigured by a user in association with a particular context, and the recommendation configuration information may recommend a potential configuration options to the user based on the context. The recommendation information may include at least a widget and one or more applications. The processor 120 may scroll the user customized list on the basis of a user input for scrolling a navigation bar or a display (e.g., the display device 160). The processor 120 may provide a user interface as shown in FIGS. 3B to 3D according to a scroll input. The processor 120 may receive a selection of at least one of the configuration information and the recommendation information included in the second user interface 320 to the fourth user interface 340 from the user through an input device (e.g., the input device 150 of FIG. 1).

In operation 405, the processor 120 may detect a user input. The user input may select and/or change configuration information, recommendation information, or both. For example, when the selected configuration information is a Wi-Fi connection, the processor 120 may detect a user input selecting activation or deactivation; e.g., "on/off." When the selected configuration information is sound, the processor 120 may detect a user input for selecting at least one of on/off for sound, on/off for variation, and on/off for silence. When the selected recommendation information is a calendar application widget, the processor 120 may detect a user input for selecting at least one of various configurations associated with the display of the widget of the calendar application.

In operation 407, the processor 120 may store the updated configuration information or the recommendation information based on the detected user input(s). For example, the processor 120 may change the Wi-Fi connection to "off" on the basis of the user input and may store the changed configuration information in the memory 130. The processor 120 may change the vibration to "on" on the basis of the user input and may store the changed configuration information in the memory 130. The processor 120 may change a method of displaying the calendar application widget on the basis of the user input, and may store the changed widget application and the changed widget display method in the memory 130 as the recommendation information.

Figure 5A:
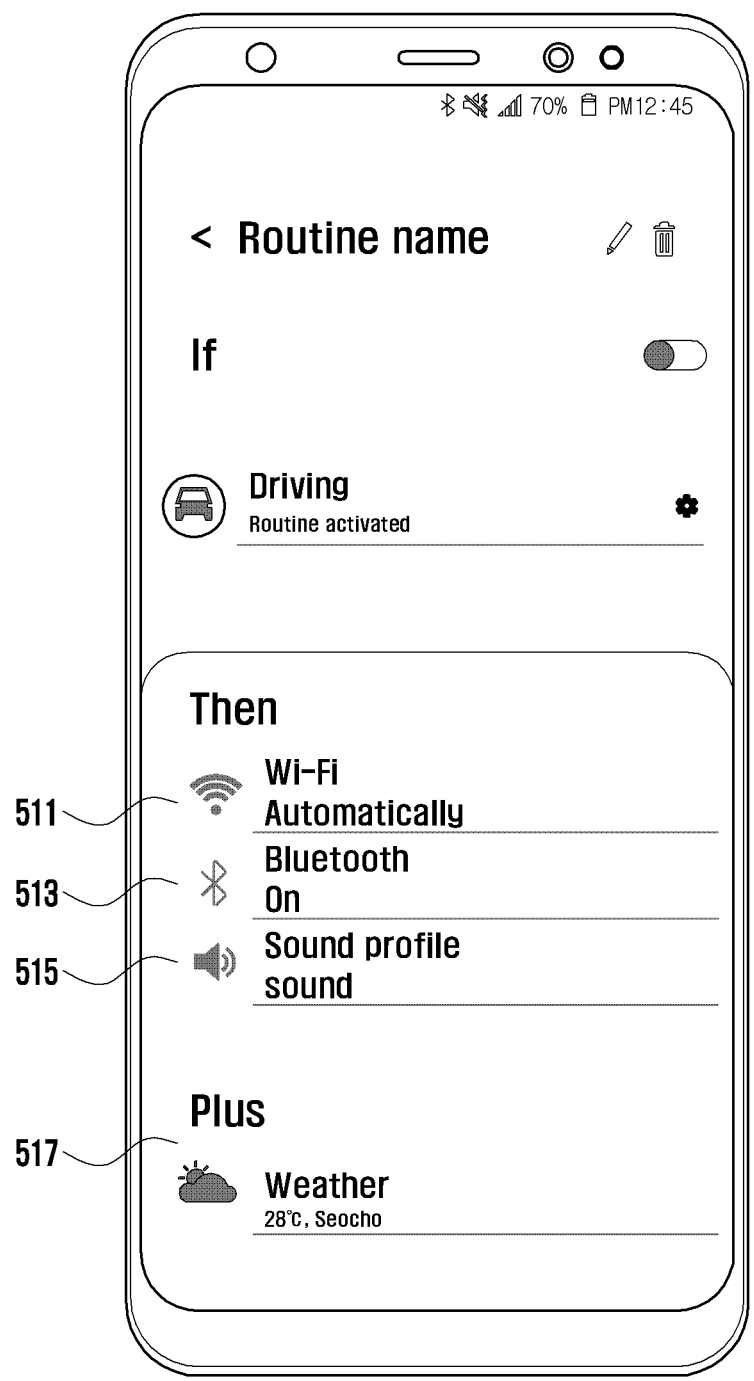
FIGS. 5A and 5B are diagrams illustrating an example of a user interface for configuring user customized information according to certain embodiments of the disclosure.
Figure 5B:
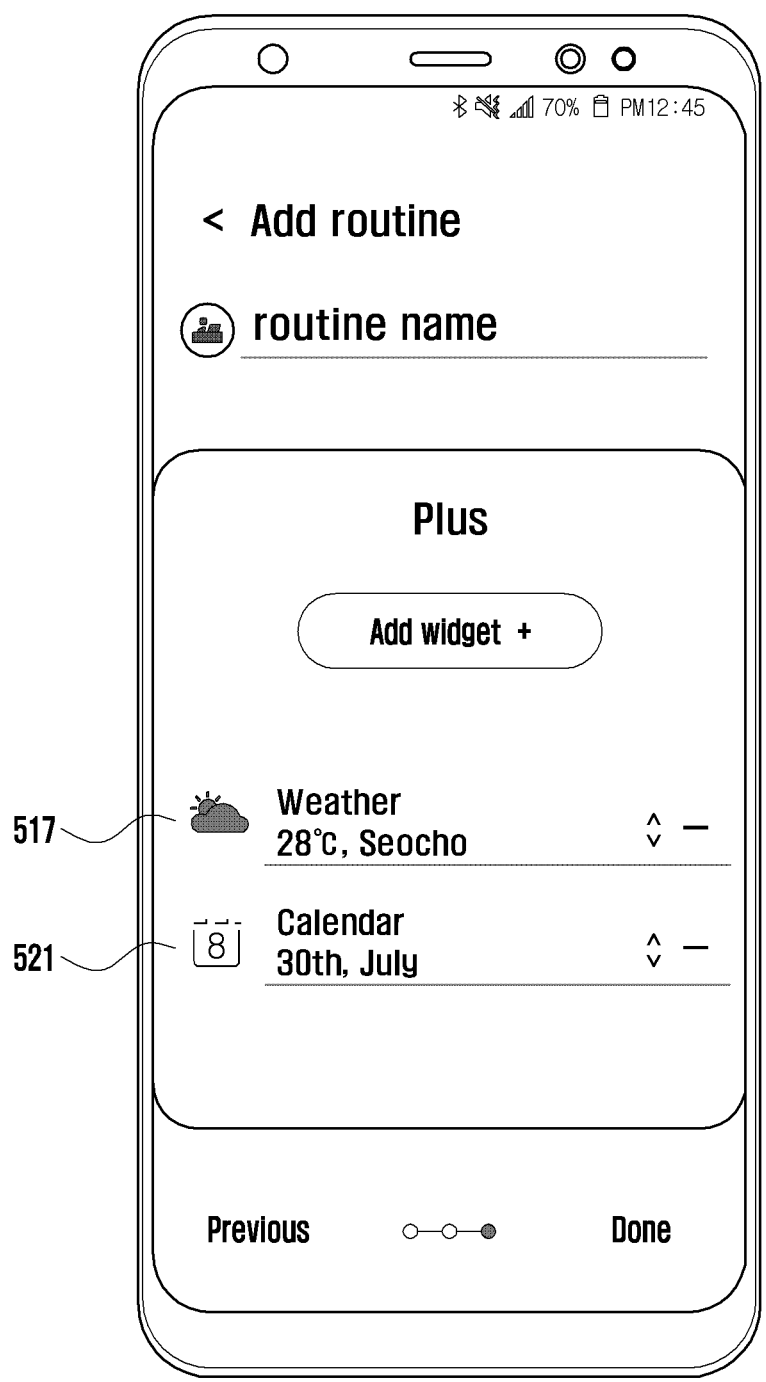

FIGS. 5A and 5B are diagrams illustrating an example of a user interface for configuring user customized information according to certain embodiments of the disclosure.

FIG. 5A is a diagram illustrating a user interface including a user customized list according to certain embodiments.

Referring to FIG. 5A, a processor (e.g., the processor 120 of FIG. 1) of an electronic device (e.g., the electronic device 101 of FIG. 1) may provide a first user interface 510 including a user customized list. The first user interface 510 may include the user customized list including at least one piece of configuration information (e.g., first configuration information 511, second configuration information 513, or third configuration information 515) and at least one piece of recommendation information (e.g., first recommendation widget information 517). When the first configuration information 511 is selected on the basis of a user input, the processor 120 may provide a window (e.g., pop-up window) including a button (e.g., on/off toggle button) for changing options (e.g., on/off) of the first configuration information 511. When the second configuration information 513 is selected, the processor 120 may provide a window for changing the option of the second configuration information 513. When the third configuration information 515 is selected, the processor may provide a window for changing options (e.g., on/off for sound, on/off for vibration, on/off for silence) of the third configuration information 515. The processor 120 may change at least one of the first configuration information 511 to the third configuration information 515 on the basis of a user input detected on the window, and may store at least one piece of the changed first configuration information 511 to third configuration information 515 in the memory 130.

FIG. 5B is a diagram illustrating a user interface for changing recommendation information according to certain embodiments.

Referring to FIG. 5B, when recommendation information is selected in the first user interface 510, the processor 120 may provide a second user interface 520. The second user interface 520 may include first recommendation widget information 517 and second recommendation widget information 521. When the first recommendation widget information 517 is selected, the processor 120 may provide a window (e.g., pop-up window) for changing widget display information of the first recommendation information (e.g., weather application). The widget display information may relate to a display position or display method of at least one of text, an image, and a video corresponding to an application. When the second recommendation widget information 521 is selected, the processor 120 may provide a window for changing the widget display method of the second recommendation application (e.g., a calendar application). The processor 120 may change the widget display method of the first recommendation widget information 517 or the second recommendation widget information 521 on the basis of the user input detected on the window, and may store the changed widget display method in the memory 130.

FIG. 6 is a flowchart illustrating a method of identifying user customized information on the basis of a usage pattern in an electronic device according to certain embodiments of the disclosure.

Referring to FIG. 6, in operation 601, a processor (e.g., the processor 120 of FIG. 1) of an electronic device (e.g., the electronic device 101 of FIG. 1) may collect usage patterns of a user. The usage pattern may refer to a tendency of the user of the electronic device 101 to use the electronic device

101. The processor 120 may collect the usage patterns of the electronic device 101 for a predetermined period of time (e.g., one day, one week, or one month) according to the configuration of the electronic device 101 or a user configuration. The processor 120 may collect at least one of time, a date, a day of the week, a location each using the electronic device 101, and an application as the usage pattern. The processor 120 may also collect a usage pattern of an external electronic device connected to (or paired with) the electronic device 101 as the usage pattern. The processor 120 may collect the usage patterns when the user agrees (or permits) to collect the usage patterns for the protection of the user's privacy. When the user agrees to information (e.g., location) collected as the usage patterns, the processor 120 may collect the information as the usage patterns.

In operation 603, the processor 120 may analyze the collected usage patterns. The processor 120 may analyze which action the user performs at which time frame on the basis of the usage patterns or which application is mainly used. For example, the processor 120 may analyze a usage pattern that the user of the electronic device 101 wakes up at 7:00 am, turns on the TV or air purifier after waking up, and leaves the house at 8 o'clock. The processor 120 may analyze the location of the house (e.g., the geographic location of the house according to the location collection agreement), the wake-up time (e.g., 7:00 am), the external electronic device (e.g., TV and air purifier) connected to (or paired with) the electronic device 101, and the time to go to work (e.g., 8:00 am). Alternatively, the processor 120 may analyze a usage pattern that the user of the electronic device 101 departs from a first location (e.g., home) at 8:00 am, arrives at a second location (e.g., work) at 8:30 am, stays at the second location from 8:30 am to 6:00 pm, and mainly uses a music application, a messenger application, or an Internet application in the second location. The processor 120 may analyze the work location (e.g., a geographic work location according to the location collection agreement), the predetermined period of time (e.g., 8:30 am to 6:00 pm) during which the user stays at work, and the used applications (e.g., the music application, the messenger application, or the Internet application).

In operation 605, the processor 120 may identify a context based on the analysis result. The context may include, for example, at least one of "waking-up," "at home," "at work," "sleeping," "driving," or "overseas trip," etc. Alternatively, the context may further include at least one of "commuting," "heading home," "at school," "charging," "in meeting," "exercising," "power saving," "auto rotation," or "execution of a specific application." The processor 120 may identify the context of "wake-up" for waking up at 7:00 am and power-on of the external electronic device (e.g., TV or air purifier). The processor 120 may identify the context of "work" for the first time (e.g., 8:30 am to 6:00 pm) and execution of the specific application (e.g., music, messenger, Internet). Alternatively, the processor 120 may identify the context of "home" for the second time (e.g., 7:00 pm to 7:00 am), execution of a specific application (e.g., a weather application or a calendar application), or an external electronic device (e.g., power on a computer, power on a radio, etc.).

According to certain embodiments, the processor 120 may "overlap" and identify different contexts on the basis of the analysis result. For example, the user may turn on the TV and the air purifier when charging the electronic device 101 at the first location (e.g., home). The processor 120 may analyze the above usage pattern to identify two contexts as "home" and "charging". Alternatively, the processor 120 may identify different contexts such as "work" and "meeting" or "head home" and "exercise". Although an example in which two contexts "overlap" has been described to help understanding of the disclosure, more than two contexts may overlap and be identified on the basis of the usage patterns.

In operation 607, the processor 120 may identify configuration information and recommendation information according to the identified context. The configuration information may be to change the configuration of the electronic device 101. For example, in a context of "sleeping", the processor 120 may identify configuration information in which the battery configuration of the electronic device 101 is configured to a "power saving mode" and the sound of the electronic device 101 is configured to "silent". In a context of "commuting (or head home)", the processor 120 may identify configuration information in which the Wi-Fi of the electronic device 101 is configured to "off" and the sound of the electronic device 101 is configured to "vibration". In a context of "home", the processor 120 may identify a cooking application or an Internet application as recommendation information. In the context of "commuting (or head home)", the processor 120 may identify a traffic application, a public transportation (e.g., bus or subway) application, or a music application as recommended information.

According to certain embodiments, the processor 120 may identify "home", "home and charging", and "home and exercise" as different contexts, and may identify the configuration information and the recommendation information differently or the same according to the identified context. The identifying the configuration information and the recommendation information according to the context is based on the usage pattern, and the processor 120 may identify different configuration information and recommendation information for different contexts, and may identify the same configuration information and recommendation information.

In operation 609, the processor 120 may store the identified configuration information and the identified recommendation information in a memory (e.g., the memory 130 of FIG. 1). The processor 120 may provide a user customized list including the configuration information and the recommendation information. The processor 120 may change the configuration information or the recommendation information on the basis of a user input. Although the processor 120 identifies and provides the configuration information and the recommendation information on the basis of the usage pattern, it may be less accurate than the user's direct input (or configuration). The processor 120 may change the configuration information or the recommendation information on the basis of the user input, and may store the changed configuration information and the changed recommendation information in the memory 130.

According to certain embodiments, the processor 120 may change the stored configuration information or the stored recommendation information on the basis of the usage pattern. Even after the configuration information and the recommendation information are configured by the user's configuration, the processor 120 may change the stored configuration information or the stored recommendation information when the usage pattern is changed and it is desirable to change the configuration information or the recommendation information.

According to certain embodiments, the processor 120 may identify the context for at least one of time, a location, and a usage pattern, and may provide a notification according to the identified context. When the provided notification is selected (or touched) by the user, the processor 120 may provide a user customized list including the configuration information and recommendation information stored in the memory 130. When the context is identified, the processor 120 may change the configuration of the electronic device 101 on the basis of the configuration information stored in the memory 130, and may change the widget of the electronic device 101 on the basis of the recommendation information stored in the memory 130. In addition, when the context is identified, the processor 120 may control an external electronic device on the basis of the configuration information associated with the identified context.

FIGS. 7A to 7F are diagrams illustrating an example of a user interface for providing user customized information according to certain embodiments of the disclosure.

Figure 7A:
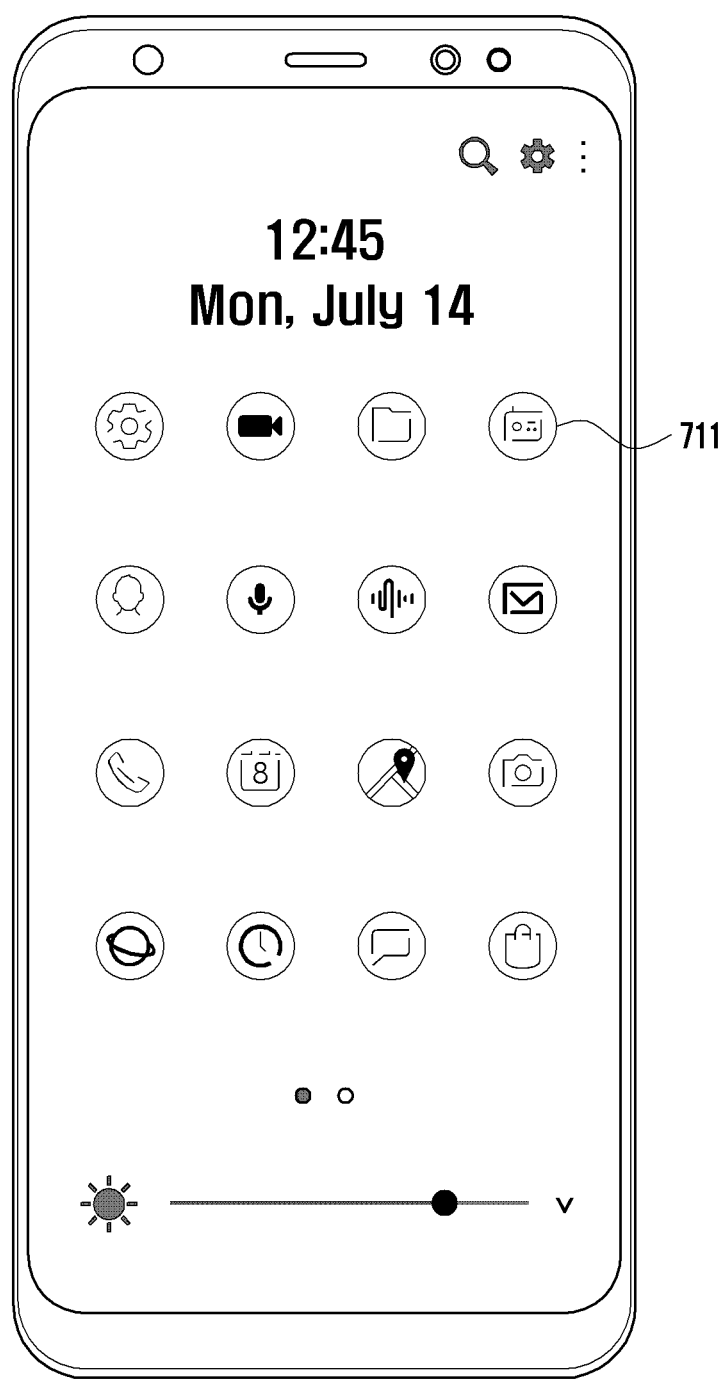
FIGS. 7A to 7F are diagrams illustrating an example of a user interface for providing user customized information according to certain embodiments of the disclosure.

FIG. 7A is a diagram illustrating an example of a user interface including an application associated with a context according to certain embodiments.

Referring to FIG. 7A, a processor (e.g., the processor 120 of FIG. 1) of an electronic device (e.g., the electronic device 101 of FIG. 1) according to certain embodiments of the disclosure may include a first user interface 710 including an application 711 associated with a context. The first user interface 710 may correspond to a home screen of the electronic device 101 and may include one or more applications. The processor 120 may receive a selection of an application 711 (or an icon corresponding to the application) associated with the context in the first user interface 710.

Figure 7B:
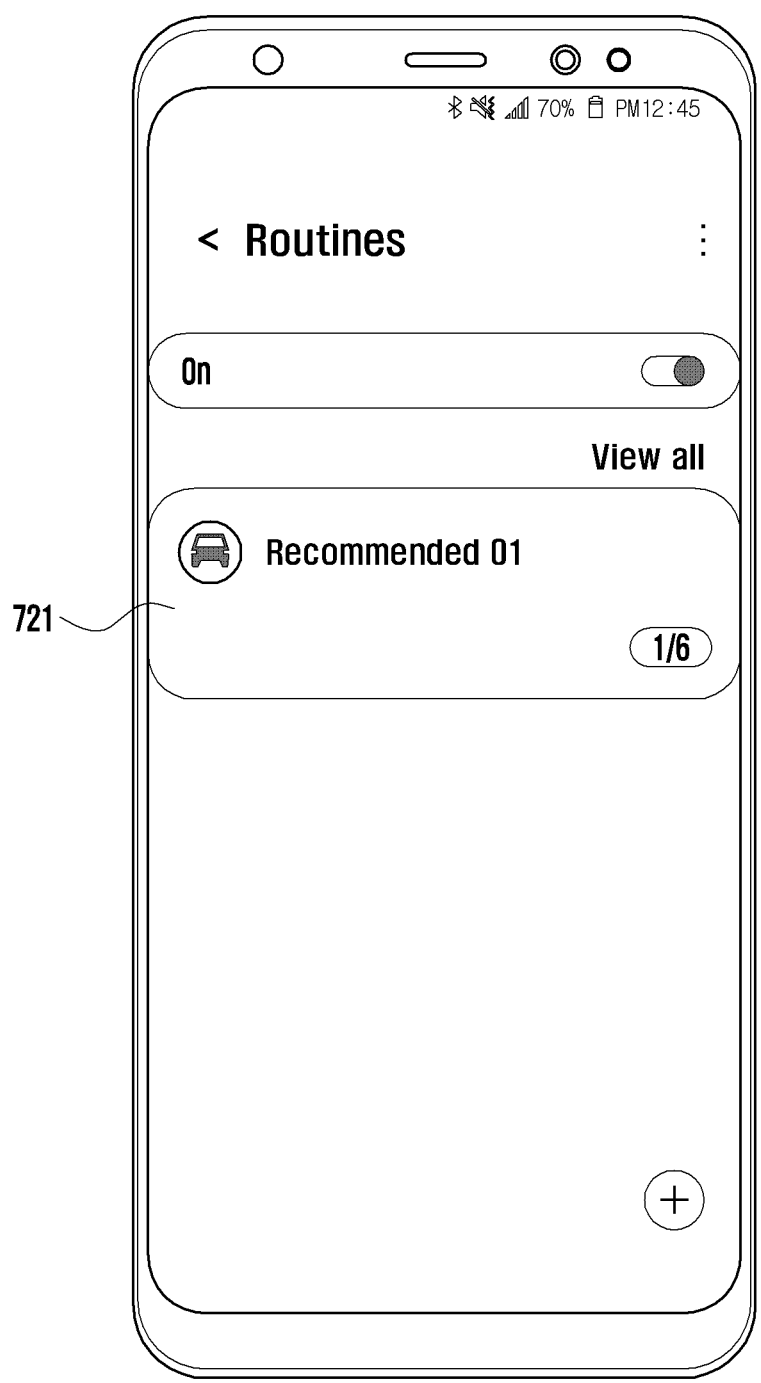

FIG. 7B is a diagram illustrating an example of a user interface including a recommendation context according to certain embodiments.

Referring to FIG. 7B, when the application 711 associated with the context is selected in the first user interface 710, the processor 120 may provide a second user interface 720. Alternatively, when a notification (e.g., the first notification 311) associated with the context is selected in the first user interface 310 as shown in FIG. 3A, the processor 120 may provide the second user interface 720. The second user interface 720 may include a recommendation context 721. The recommendation context 721 may recommend a context determined to correspond to the current state on the basis of a usage pattern. The processor 120 may provide the second user interface 720 when the recommendation context 721 is detected, while no pre-stored context (or context information) in the application 711 matches the context. When the recommendation context 721 is selected, the processor 120 may provide a user customized list (e.g., configuration information or recommendation information) according to the recommendation context 721, including whether the recommendation context 721 is used (e.g., on/off).

Figure 7C:
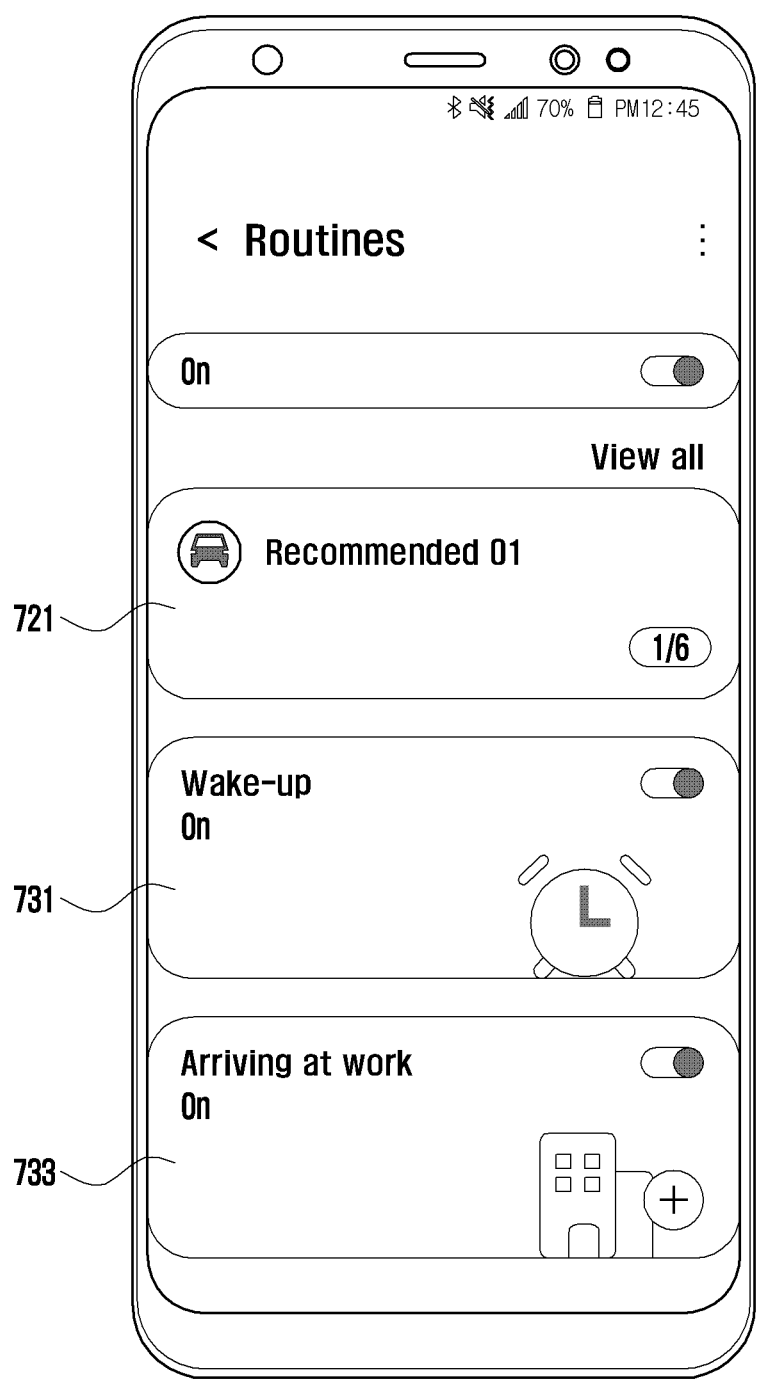

FIG. 7C is a diagram illustrating an example of a user interface including a recommendation context according to certain embodiments.

Referring to FIG. 7C, when the application 711 associated with the context is selected in the first user interface 710, the processor 120 may provide a third user interface 730. When a notification (e.g., a first notification 311) associated with the context is selected in the first user interface 310, as shown in FIG. 3A, the processor 120 may provide a third user interface 730. When the recommendation context is identified in a state in which there is a context registered in the application 711 associated with the context, the processor 120 may provide the third user interface 730. The third user interface 730 may include a recommended context 721, a first context 731 and a second context 733. The first context 731 may be for a context of "weather", and the second context 733 may be for a context of "work". When the first context 731 is selected, the processor 120 may provide a user customized list according to the first context 731 including whether the first context 731 is used. When the second context 733 is selected, the processor 120 may provide a user customized list (e.g., configuration information or recommendation information) according to the second context 733 including whether the second context 733 is used.

Figure 7D:
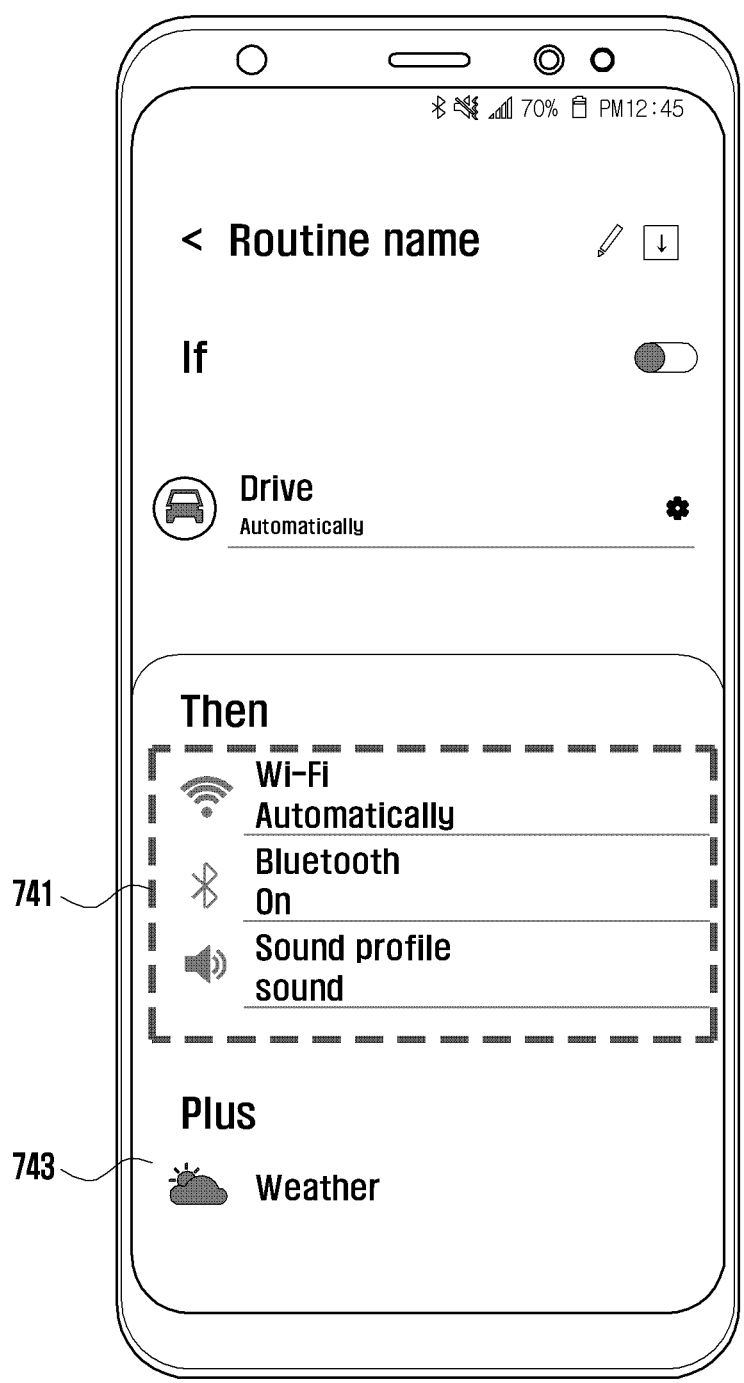

FIG. 7D is a diagram illustrating an example of a user interface including a user customized list according to a recommendation context according to certain embodiments.

Referring to FIG. 7D, when the recommendation context 721 is selected in the second user interface 720, the processor 120 may provide a fourth user interface 740. The fourth user interface 740 may include configuration information 741 and recommendation information 743. The configuration information 741 may be a configuration of the electronic device 101 recommended within the recommendation context 721. The options displayed within the list of the configuration information 741 may initially be set to a default operative state of the electronic device 101. The recommendation information 743 may include a recommended application within the recommendation context 721. A display of the widget of the recommendation information 743 may be configured to show a default display of the application.

Figure 7E:
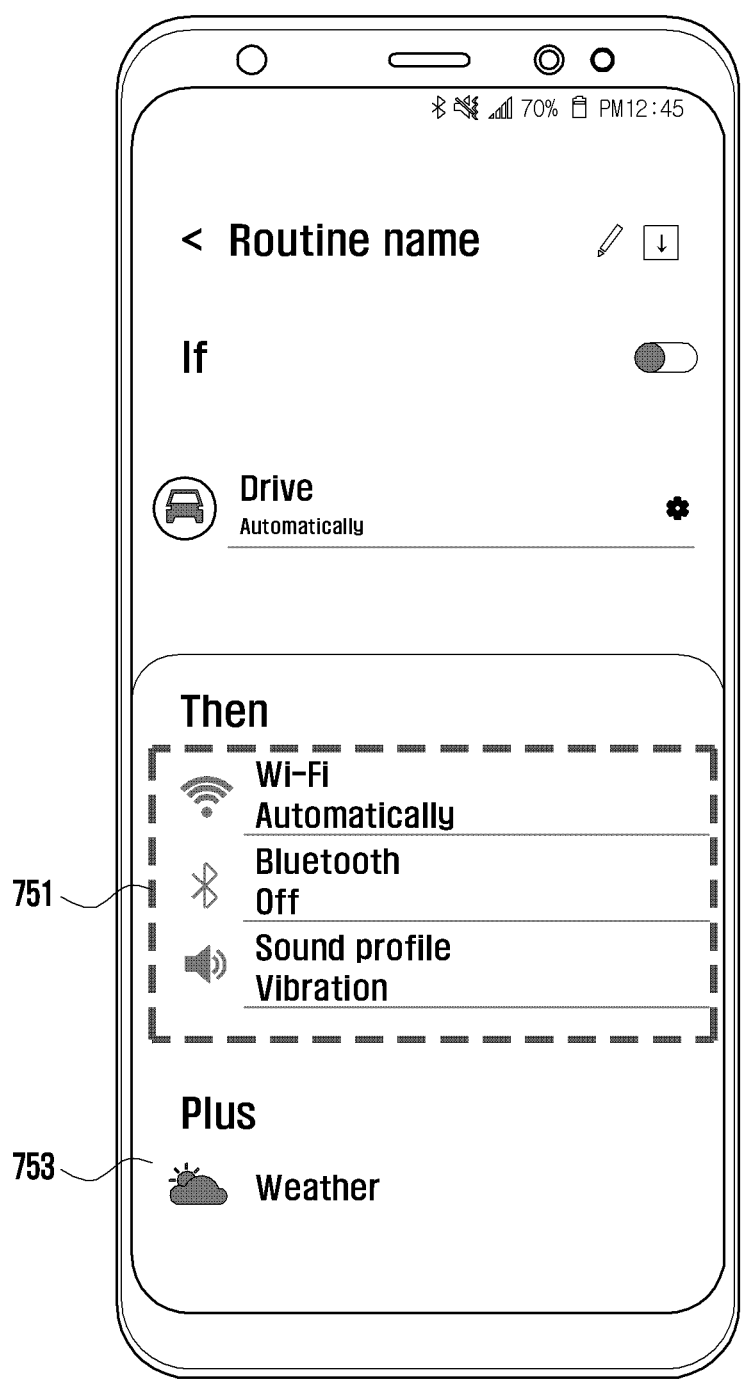

FIG. 7E is a diagram illustrating an example of a user interface including a user customized list according to a recommendation context according to certain embodiments of the disclosure.

Referring to FIG. 7E, when the recommended context 721 is selected in the second user interface 720, the processor 120 may provide a fifth user interface 750. The fifth user interface 750 may include configuration information 751 and recommendation information 753. The option of the configuration information 751 may be configured on the basis of the usage pattern. For example, the processor 120 may change and provide the option of the configuration information 751 on the basis of the usage pattern. Comparing the fourth user interface 740 and the fifth user interface 750, it can be seen that the options of the configuration information 741 are "on" for Bluetooth and "sound" for sound profile, but the options of the configuration information 751 are changed to "off" for Bluetooth and "variation" for sound profile. When providing the configuration information 751 according to the recommendation context 721, the processor 120 may display the configuration information 751 using settings that are based on the usage pattern.

Figure 7F:
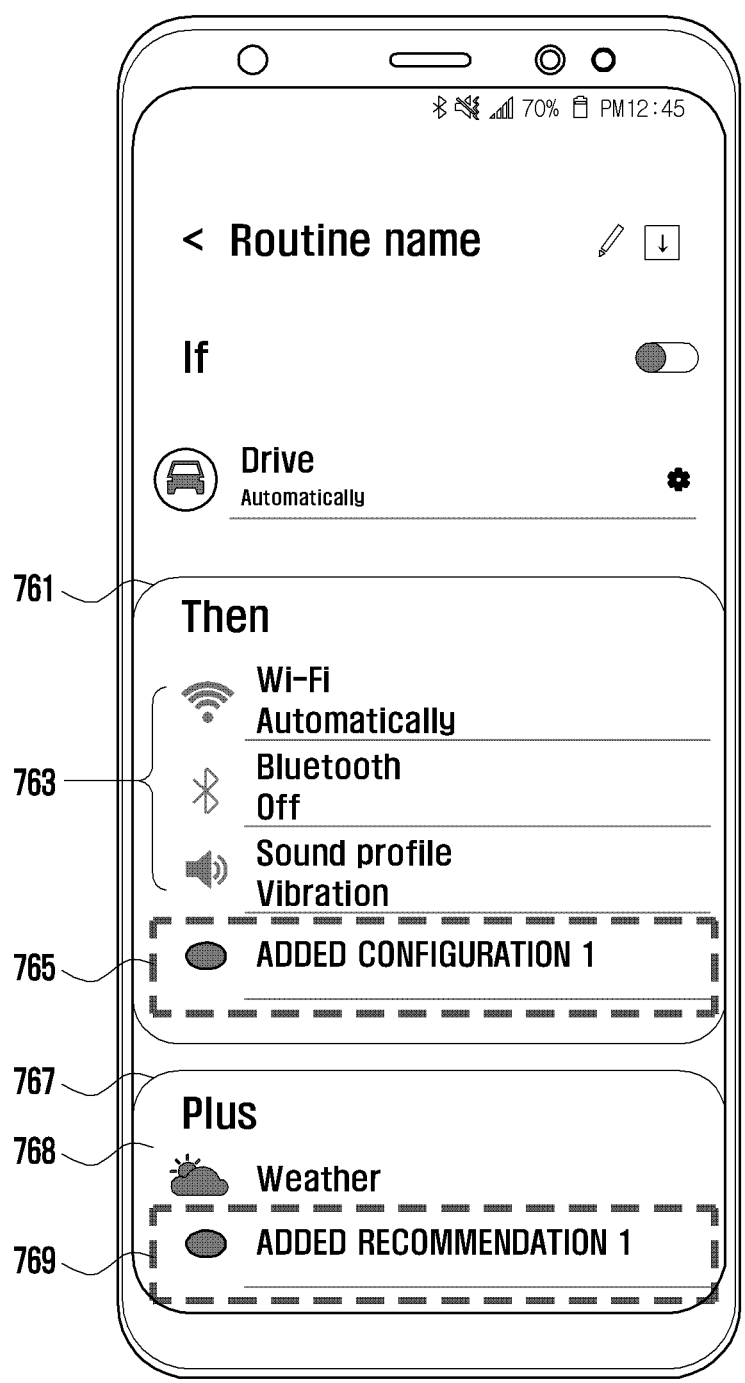

FIG. 7F is a diagram illustrating an example of a user interface including a user customized list according to a recommendation context according to certain embodiments of the disclosure.

Referring to FIG. 7F, when the recommendation context 721 is selected in the second user interface 720, the processor 120 may provide a sixth user interface 760. The sixth user interface 760 may include configuration information 761 and recommendation information 767. The configuration information 761 may include first recommendation configuration information 763 or second recommendation configuration information 765. The first recommendation configuration information 763 or the second recommendation configuration information 765 may be a configuration of the electronic device 101 that can be recommended in the recommendation context 721. The options within the first recommendation configuration information 763 may be configured based on the usage pattern. For example, the processor 120 may change and provide the option of the first recommendation configuration information 763 on the basis of the usage pattern. The second recommendation configuration information 765 may be configured as a default configuration option of the electronic device 101. The processor 120 may provide the first recommendation configuration information 763 or the second recommendation configuration information 765 on the basis of the configuration of the electronic device 101 or a user configuration.

The recommendation information 767 may include first recommendation widget information 768 or second recommendation widget information 769. The processor 120 may provide the first recommendation widget information 768 or the second recommendation widget information 769 on the basis of the usage pattern. When the first recommendation widget information 768 is selected, the processor 120 may provide a widget display list related to the widget display of the first application. The widget display list may include at least one piece of widget display information. The widget display information may be obtained by changing the display position or the display method of at least one of text, an image, and a video corresponding to the first application. The processor 120 may display the first recommendation widget information 768 on the basis of the widget display information selected from the widget display list. When the second recommendation widget information 769 is selected, the processor 120 may provide a widget display list related to the widget display of the second application.

Figure 8:
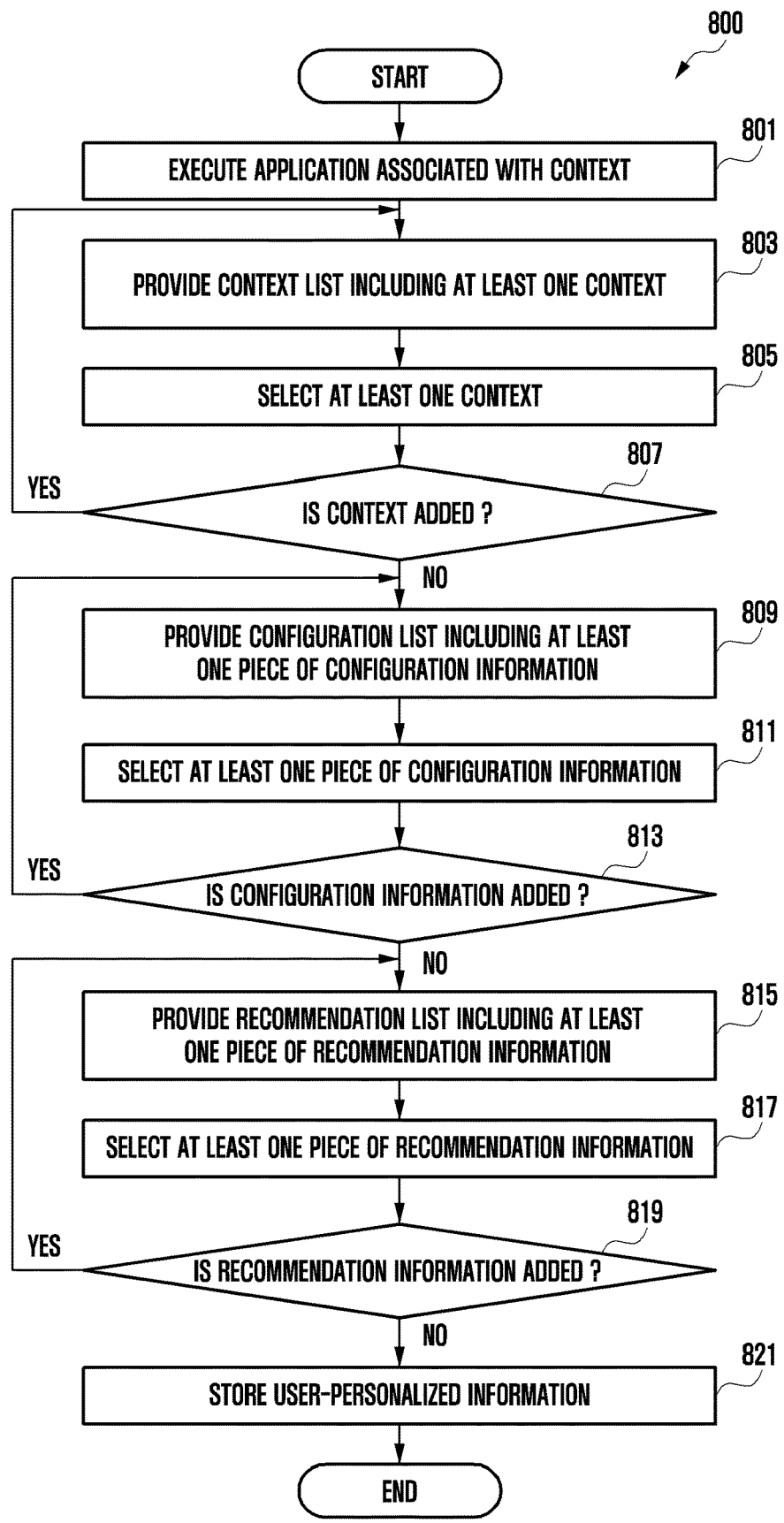
FIG. 8 is a flowchart illustrating a method of configuring user customized information on the basis of a user input in an electronic device according to certain embodiments of the disclosure.

FIG. 8 is a flowchart illustrating a method of configuring user customized information on the basis of a user input in an electronic device according to certain embodiments of the disclosure.

Referring to FIG. 8, in operation 801, a processor (e.g., the processor 120 of FIG. 1) of an electronic device (e.g., the electronic device 101 of FIG. 1) according to certain embodiments may execute an application associated with a context. The processor 120 may execute the application associated with the context on the basis of a user input for selecting an icon or notification of the application associated with the context displayed on a display (e.g., the display device 160 of FIG. 1) of the electronic device 101. For example, the processor 120 may select an icon of the application associated with the context on the home screen of the electronic device 101 or detect a user input for selecting a notification of the application associated with the context on the lock screen of the electronic device 101, and may execute the application associated with the context on the basis of the detected user input. Alternatively, the processor 120 may provide a notification list when detecting a user input for dragging a corresponding screen from the top bezel of the electronic device 101 to the display device 160, and may detect a user input for selecting the notification associated with the context from the notification list to execute the application associated with the context.

In operation 803, the processor 120 may provide a context list including at least one context. The context list may include one or more of preset potential contexts, such as waking-up, home, work, sleeping, driving, and overseas trip. Alternatively, the context list may further include at least one of commuting, head home, school, charging, meeting, exercise, power saving, auto rotation, or execution of a specific application. In addition, the context list may further include time information and location information. According to certain embodiments, the processor 120 may generate a new context on the basis of the time information and the location information in addition to the above context. The processor 120 may generate a new context (e.g., an English academy) on the basis of a user input for selecting a specific day (e.g., Monday or Wednesday) or a specific location (e.g., Gangnam-Gu, Seoul), and may add the generated context (e.g., context name) to the context list.

According to certain embodiments, the context list may include a registered context or a registerable context (e.g., a recommended context). For example, when there is no context registered in the application associated with the context, the processor 120 may provide a registerable context (e.g., the recommendation context 721) on the basis of the usage pattern as in the second user interface 720 of FIG. 7B. When there is a registered context in the application associated with the context, the processor 120 may provide a registered context (e.g., the first context 731 and the second context 733) and a recommendation context (e.g., the recommendation context 721) as in the third user interface 730 of FIG. 7C.

In operation 805, the processor 120 may select and/or detect a selection of at least one context. The processor 120 may select at least one context from the context list on the basis of a user input. The selected context may be either a registered context (e.g., the first context 731 and the second context 733) or a registerable context (e.g., the recommendation situation 721). The operations described below may be used to describe an example of adding a new context to a registered context or registering (or generating) a new context.

In operation 807, the processor 120 may identify (or determine) whether a context addition is requested. When at least one context is selected from the context list, the processor 120 may provide a user interface including the selected context. The user interface may include a button (e.g., a change button) for changing (e.g., deleting/changing) the selected context, a button (e.g., a next button) for selecting (or registering) configuration information according to the context, and a button (e.g., an addition button) for adding another context. For example, when the change button is selected in the user interface, the processor 120 may change a configuration (e.g., on/off, change of context name, etc.) for the selected context on the basis of a user input. Alternatively, when the next button (or the next page) is selected in the user interface, the processor 120 may determine that the context selection has been completed. When the addition button is selected in the user interface, the processor 120 may determine that the context selection has not been completed. The processor 120 may return to operation 803 when the context addition is requested, and may perform operation 809 when the context addition is not requested. When the context addition is requested, the processor 120 may return to operation 803 to provide a context list, and may further add another context (e.g., meeting, a specific time and date) to the selected context (e.g., work) on the basis of the user input.

When the context addition is not requested, in operation 809, the processor 120 may provide a configuration list including at least one piece of configuration information. The processor 120 may provide the configuration list on the basis of the selected context or the usage pattern. The configuration list may include registered configuration information or recommended configuration information. The registered configuration information may be a configuration of the electronic device 101 previously registered in association with the selected context. The recommendation configuration information may be a configuration of the electronic device 101 that can be registered in association with the selected context.

In operation 811, the processor 120 may select and/or detect a selection of at least one piece of configuration information. The processor 120 may select at least one piece of configuration information from the configuration list on the basis of a user input. The selected configuration information may be either registered configuration information or recommendation configuration information.

In operation 813, the processor 120 may identify (or determine) whether the addition of configuration information is requested. When at least one piece of configuration information is selected from the configuration list, the processor 120 may provide a user interface including the selected configuration information. The user interface may include a button (e.g., a change button) for changing (e.g., deleting/changing) selected configuration information, a button (e.g., a next button) for selecting recommendation information according to the context, and a button (e.g., an addition button) for adding other configuration information.

For example, when the change button is selected in the user interface, the processor 120 may change a configuration (e.g., on/off) of the selected configuration information on the basis of a user input. Alternatively, when the next button (or the next page) is selected in the user interface, the processor 120 may determine that the configuration information selection is completed. When the addition button is selected in the user interface, the processor 120 may determine that the configuration information selection is not completed. The processor 120 may return to operation 809 when addition of configuration information is requested, and may perform operation 815 when the addition of configuration information is not requested. When the addition of configuration information is requested, the processor 120 may return to operation 809 to provide a configuration list, and may further add other configuration information (e.g., "off" for Bluetooth) to the selected configuration information (e.g., "on" for Wi-Fi) on the basis of the user input.

When the addition of configuration information is not requested, in operation 815, the processor 120 may provide a recommendation list including at least one piece of recommendation information. The processor 120 may provide the recommendation list on the basis of the selected context or the usage pattern. The recommendation list may include registered recommendation information or registerable recommendation information. The registered recommendation information may be an application registered in advance in association with the selected context. The registerable recommendation information may be an application that can be registered in association with the selected context. The recommendation information may be provided in the form of a recommendation widget.

In operation 817, the processor 120 may select and/or detect selection of at least one piece of recommendation information. The processor 120 may select at least one piece of recommendation information from the recommendation list on the basis of the user input. The selected recommendation information may be either registered recommendation information or registerable recommendation information.

In operation 819, the processor 120 may identify (or determine) whether addition of recommendation information is requested. When at least one piece of recommendation information is selected from the recommendation list, the processor 120 may provide a user interface including the selected recommendation information. The user interface may include a button (e.g., a change button) for changing (e.g., deleting/changing) the selected recommendation information, a button (e.g., a completion button) for completing user customized information registration according to the context, and a button (e.g., an addition button) for adding other recommendation information.

For example, when the change button is selected in the user interface, the processor 120 may change a widget display method for the selected recommendation information on the basis of the user input. Alternatively, when the completion button is selected in the user interface, the processor 120 may determine that selection of recommendation information has been completed. When the addition button is selected in the user interface, the processor 120 may determine that the selection of recommendation information has not been completed. The processor 120 may return to operation 815 when the addition of recommendation information is requested, and may perform operation 821 when the addition of recommendation information is not requested. When the addition of recommendation information is requested, the processor 120 may return to operation 815 to provide a recommendation list, and may further add other recommendation information (e.g., a calendar application) to the selected recommendation information (e.g., a traffic application) on the basis of the user input.

When the addition of recommendation information is not requested, in operation 821, the processor 120 may store user customized information in a memory (e.g., the memory 130 of FIG. 1). The user customized information may include configuration information or recommendation information according to the context. The processor 120 may register new user customized information or change the registered user customized information on the basis of the user input.

Figure 9A:
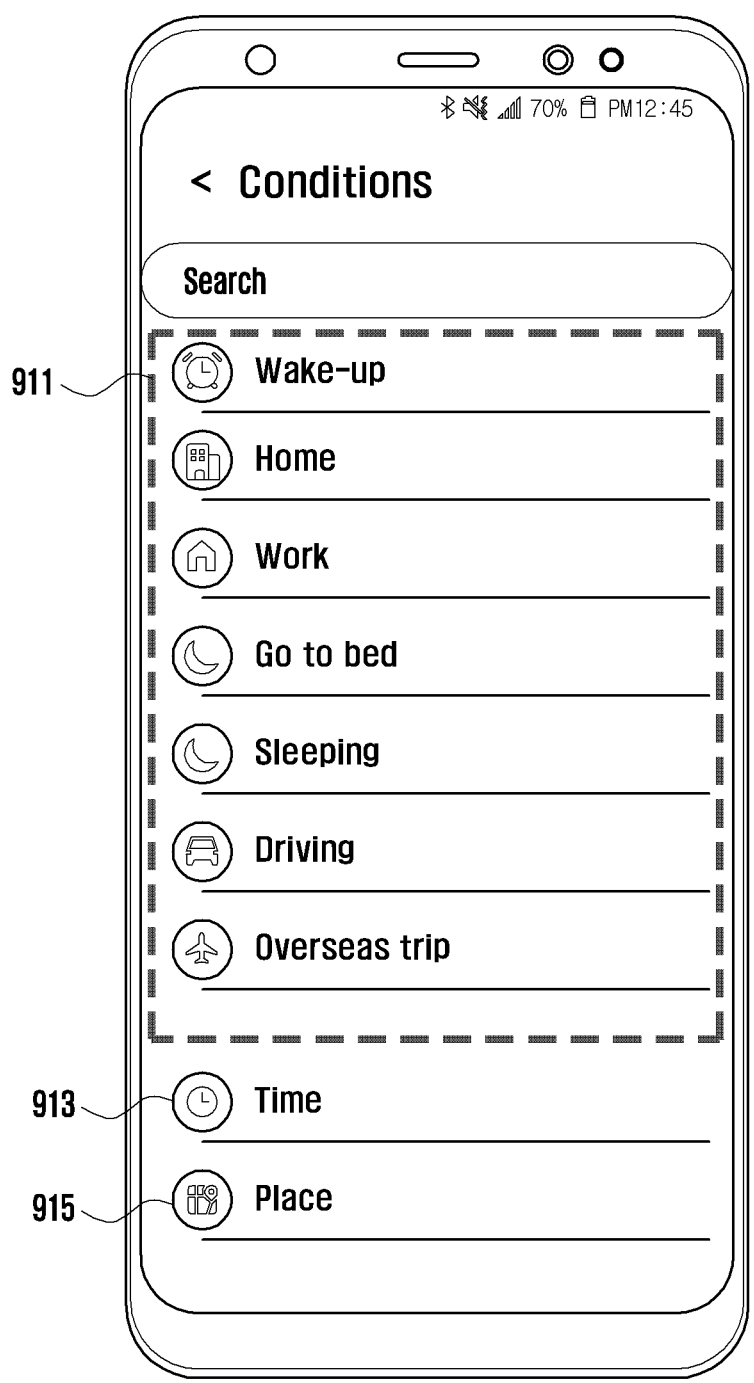
FIGS. 9A and 9B are diagrams illustrating an example of a user interface for configuring a context according to certain embodiments of the disclosure.
Figure 9B:
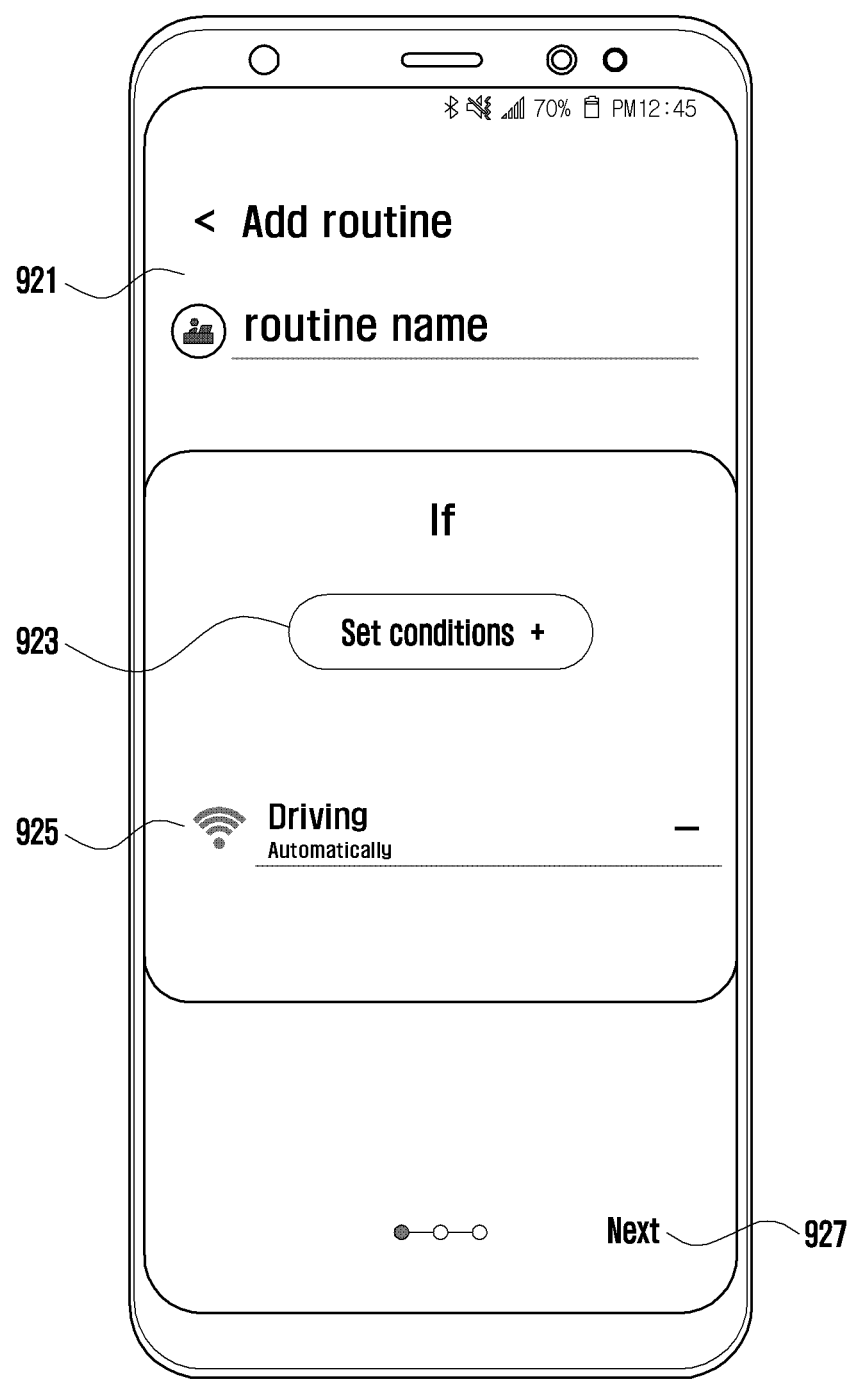

FIGS. 9A and 9B are diagrams illustrating an example of a user interface for configuring a context according to certain embodiments of the disclosure.

FIG. 9A is a diagram illustrating an example of a user interface including a context list including at least one context.

Referring to FIG. 9A, a processor (e.g., the processor 120 of FIG. 1) of an electronic device (e.g., the electronic device 101 of FIG. 1) according to certain embodiments may provide a context list including at least one context. The processor 120 may provide a first user interface 910 including the context list. The first user interface 910 may include a context list 911 including at least one of wake-up, home, work, go to bed, sleeping, driving, or overseas trip. In addition, the first user interface 910 may further include time information 913 and location information 915. According to certain embodiments, the processor 120 may generate a new context on the basis of the time information 913 and the location information 915 in addition to the context list 911. The processor 120 may generate a new context (e.g., exercise) on the basis of a user input for selecting a specific day (e.g., Monday or Wednesday) or a specific location (e.g., Gangnam-Gu, Seoul), and may add the generated context (e.g., context name) to the context list 911.

FIG. 9B is a diagram illustrating an example of a user interface including a selected context.

Referring to FIG. 9B, when at least one context is selected in the first user interface 910, the processor 120 may provide the second user interface 920. The second user interface 920 may include a change field 921 for changing information (e.g., name) associated with the context, an addition button 923 for adding another context, and a next button 927 for selecting configuration information in association with the selected context 925 or the selected context 925. When the change field 921 is selected in the second user interface 920, the processor 120 may change the name of the selected context on the basis of the user input. When the selected context 925 is selected in the second user interface 920, the processor 120 may change a configuration (e.g., on/off) for the selected context on the basis of the user input. When the addition button 923 is selected in the second user interface 920, the processor 120 may provide the first user interface 910 as shown in FIG. 9A to add another context. Alternatively, when the next button 927 is selected in the second user interface 920, the processor 120 may provide a user interface for selecting configuration information associated with the selected context 925.

Figure 10A:
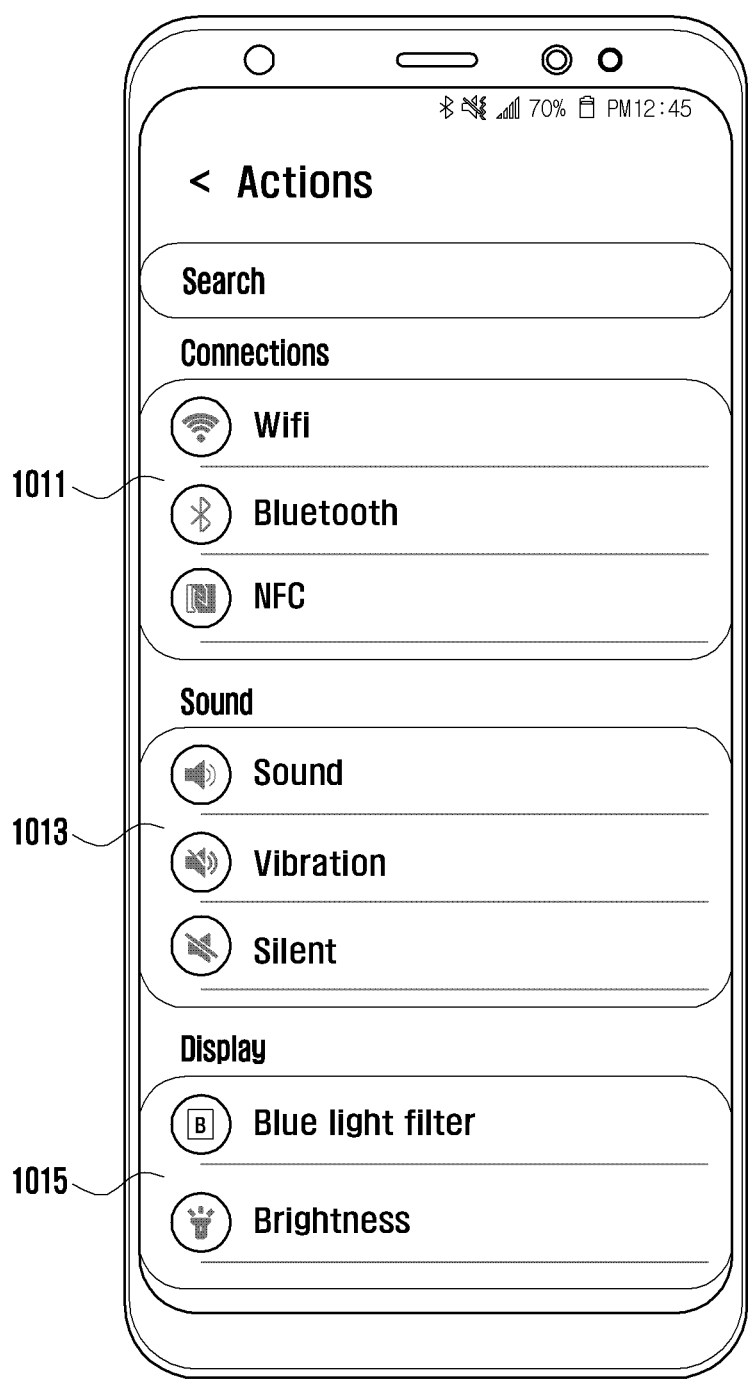
FIGS. 10A and 10B are diagrams illustrating an example of a user interface for configuring configuration information according to certain embodiments of the disclosure.
Figure 10B:
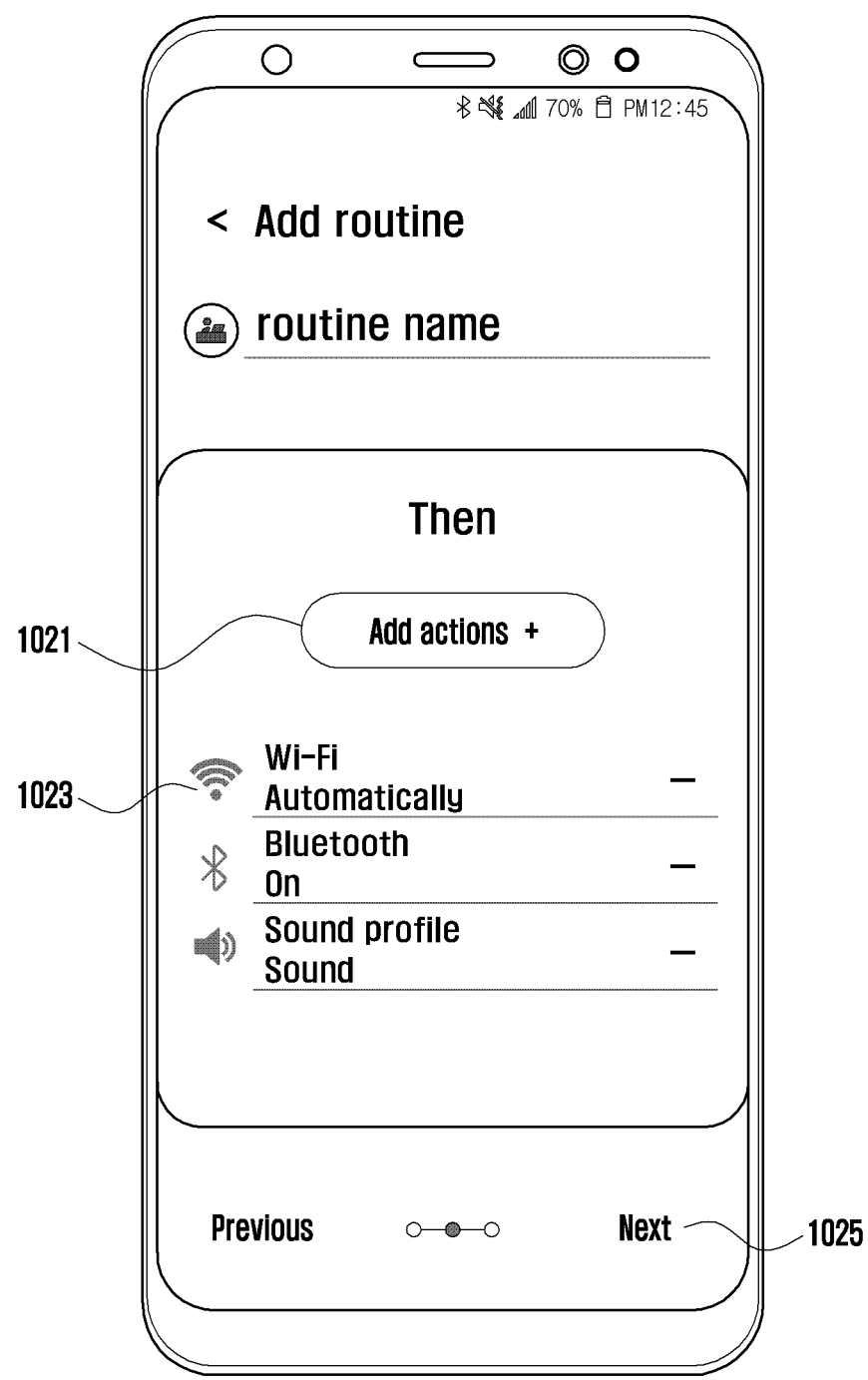

FIGS. 10A and 10B are diagrams illustrating an example of a user interface for configuring configuration information according to certain embodiments of the disclosure.

FIG. 10A is a diagram illustrating an example of a user interface including a configuration list including at least one piece of configuration information.

Referring to FIG. 10A, a processor (e.g., the processor 120 of FIG. 1) of an electronic device (e.g., the electronic device 101 of FIG. 1) according to certain embodiments may provide a context list including at least one piece of context information. The processor 120 may provide a first user interface 1010 including the configuration list. The first user interface 1010 may include a configuration list including at least one of configuration information 1011 associated with connection configuration (e.g., Wi-Fi, Bluetooth, or NFC) of the electronic device 101, configuration information 1013 associated with sound configuration (e.g., sound, vibration, or silent) of the electronic device 101, or configuration information 1015 associated with display configuration (e.g., blue light filter or brightness) of the electronic device 101. The processor 120 may further display configuration information included in Table 1 on the basis of a user input for scrolling the first user interface 1010.

FIG. 10B is a diagram illustrating an example of a user interface including selected configuration information.

Referring to FIG. 10B, when at least one piece of configuration information is selected in the first user interface 1010, the processor 120 may provide the second user interface 1020. The second user interface 1020 may include an addition button 1021 for adding other configuration information and a next button 1025 for selecting recommendation information in association with the selected configuration information 1023 or the selected context (e.g., the selected context 925 of FIG. 9B). When the selected configuration information 1023 is selected in the second user interface 1020, the processor 120 may change a configuration (e.g., on/off) for the selected configuration information on the basis of the user input. When the addition button 1021 is selected in the second user interface 1020, the processor 120 may provide the first user interface 1010 as shown in FIG. 10A. Alternatively, when the next button 1025 is selected in the second user interface 1020, the processor 120 may provide a user interface for selecting recommendation information associated with the selected context 925.

Figure 11A:
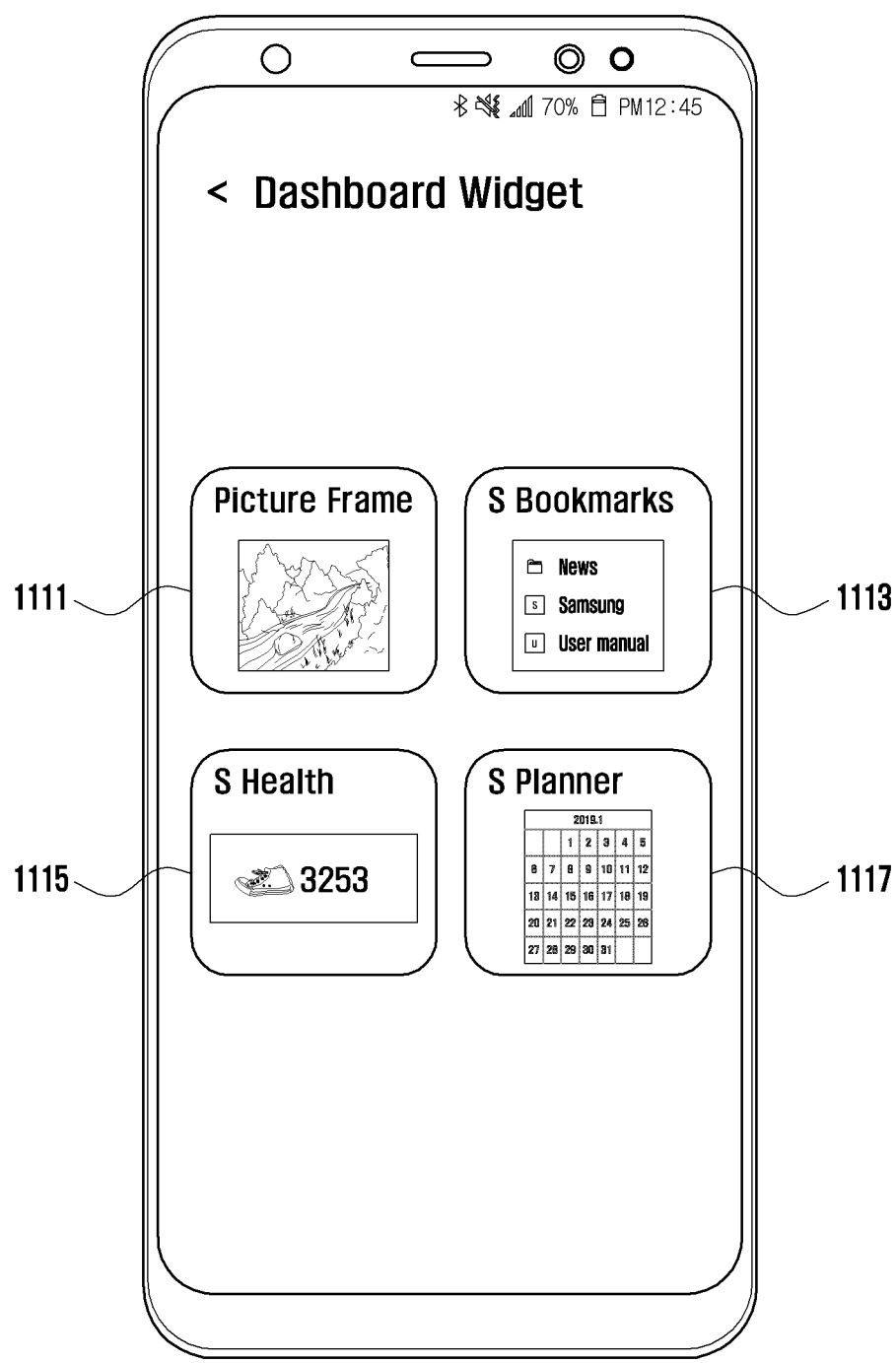
FIGS. 11A and 11B are diagrams illustrating an example of a user interface for configuring recommendation information according to certain embodiments of the disclosure.
Figure 11B:
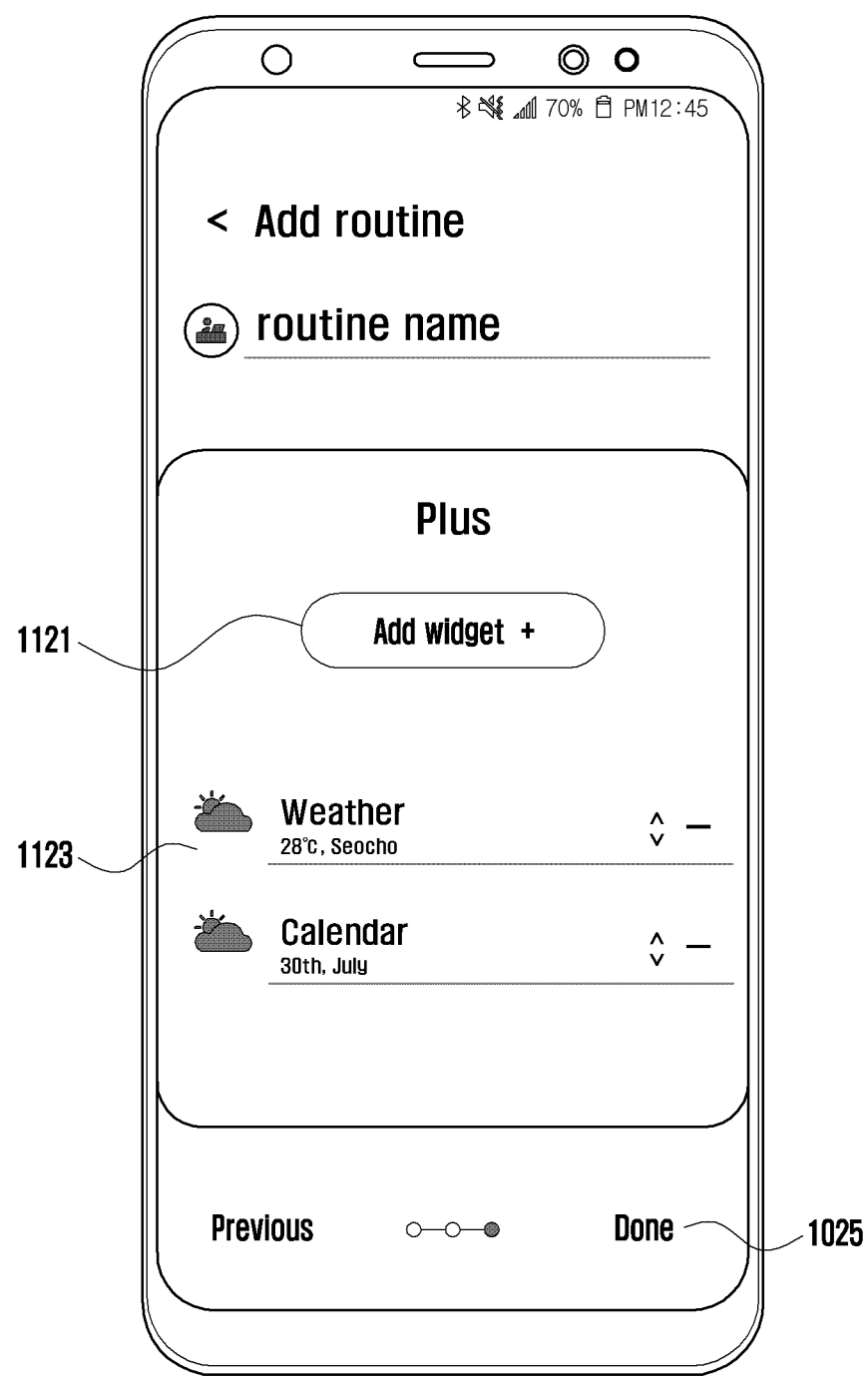

FIGS. 11A and 11B are diagrams illustrating an example of a user interface for configuring recommendation information according to certain embodiments of the disclosure.

FIG. 11A is a diagram illustrating an example of a user interface including a recommendation list including at least one piece of recommendation information.

Referring to FIG. 11A, a processor (e.g., the processor 120 of FIG. 1) of an electronic device (e.g., the electronic device 101 of FIG. 1) according to certain embodiments may provide a recommendation list including at least one piece of recommendation information. The processor 120 may provide a first user interface 1110 including the recommendation list. The first user interface 1110 may include a recommendation list including at least one piece of recommendation information 1111 associated with a first application, recommendation information 1113 associated with a second application, recommendation information 1115 associated with a third application, or recommendation information 1117 associated with a fourth application. The processor 120 may further display other recommendation information on the basis of a user input for scrolling the first user interface 1110. The recommendation information may include widget display information on different applications, or different widget display information on the same application.

FIG. 11B is a diagram illustrating an example of a user interface including selected recommendation information.

Referring to FIG. 11B, when at least one piece of recommendation information is selected in the first user interface 1110, the processor 120 may provide a second user interface 1120. The second user interface 1120 may include an addition button 1121 for adding other recommendation information and a completion button 1125 for completing user customized information registration associated with the selected recommendation information 1123 or the selected context (e.g., the selected context 925 of FIG. 9B). When the recommendation information 1123 is selected in the second user interface 1120, the processor 120 may change a configuration (e.g., widget display method) for the selected recommendation information on the basis of a user input. When the addition button 1121 is selected in the second user interface 1120, the processor 120 may provide the first user interface 1110 as shown in FIG. 11A. Alternatively, when the completion button 1125 is selected in the second user interface 1120, the processor 120 may complete the user customized information registration associated with the selected context 925. The processor 120 may store the configuration information and recommendation information associated with the context 925 in a memory (e.g., the memory 130 of FIG. 1).

A method of operating an electronic device (e.g., the electronic device 101 of FIG. 1) according to certain embodiments of the disclosure may include: identifying a context on the basis of at least one of time, a location, or a usage pattern; providing a notification associated with the identified context; detecting a user input for selecting the provided notification; and providing configuration information and recommendation information associated with the context.

The method may further include overlapping and configuring at least two contexts on the basis of the usage pattern or a user's configuration.

The method may further include changing a configuration of the electronic device on the basis of the configuration information associated with the identified context.

The method may further include changing a widget of the electronic device on the basis of the recommendation information associated with the identified context.

The providing of the configuration information may include providing configuration information obtained by changing the configuration of the electronic device on the basis of the usage pattern when the usage pattern is analyzed; and providing configuration information configured as a default of the electronic device when the usage pattern is not analyzed.

The method may further include: changing the configuration information or the recommendation information on the basis of a user input for information change; and storing the changed configuration information or the changed recommendation information in the memory.

The method may further include changing the stored configuration information and the stored recommendation information on the basis of the usage pattern.

The method may further include: collecting the usage patterns on the basis of a tendency of using the electronic device; analyzing the collected usage patterns; and using the analysis result to identify the context.

The method may further include controlling an external electronic device on the basis of the configuration information associated with the identified context.

Certain embodiments of the disclosure disclosed in the specification and drawings are merely provided for specific examples in order to easily explain the technical contents of the disclosure and help the understanding of the disclosure, and are not intended to limit the ambit of the disclosure. Therefore, the ambit of the disclosure should be construed as including all changes or modifications derived based on the technical features of the disclosure in addition to the embodiments disclosed herein are included in the ambit of the disclosure.

What is claimed is:

1. An electronic device, comprising:
   a memory; and
   a processor,
   wherein the processor is configured to:
     execute an application associated with a context;
     display a context list including at least one context through the executed application;
     receive a selection of at least one context from the context list on the basis of user input;
     display a user interface including a button for changing the selected context, a button for selecting configuration information according to the selected context, and a button for adding another context, when at least one context is selected from the context list;
     determine whether a context addition is requested;
     provide a configuration list including at least one piece of configuration information, when the context addition is not requested;
     detect a selection of at least one piece of configuration information;
     determine whether the addition of configuration information is requested;
     provide a recommendation list including at least one piece of recommendation information, when the addition of configuration information is not requested;
     detect selection of at least one piece of recommendation information;
     determine whether addition of recommendation information is requested;
     store user customized information including configuration information or recommendation information according to the selected context in the memory, when the addition of recommendation information is not requested;
     identify a context on the basis of at least one of time, a location, or a usage pattern, wherein the identified context comprises at least two contexts on the basis of the usage pattern or a user's configuration;
     provide a notification associated with the identified context;
     detect a user input for selecting the provided notification; and
     provide configuration information or recommendation information associated with the context based on a user customized list stored in the memory.

2. The electronic device of claim 1, wherein the processor is configured to change a configuration of the electronic device based on the provided configuration information associated with the identified context.

3. The electronic device of claim 1, wherein the processor is configured to change a widget of the electronic device based on the recommendation information associated with the identified context.

4. The electronic device of claim 1, wherein:
   when the usage pattern is analyzed, the configuration information indicates a change in a configuration of the electronic device based on the usage pattern; and
   when the usage pattern is not analyzed, the configuration information indicates a default configuration for the electronic device.

5. The electronic device of claim 1, wherein the processor is configured to:
   change the stored configuration information or the stored recommendation information based on the usage pattern.

6. The electronic device of claim 1, wherein the processor is configured to:
   collect the usage pattern on the basis of a tendency of using the electronic device;
   analyze the collected usage pattern; and
   use the analysis result to identity the context.

7. The electronic device of claim 1, wherein the usage pattern includes at least one of a time, a date, a day of the week, a location, or an application each using the electronic device.

8. The electronic device of claim 1, wherein the processor is configured to collect a usage pattern of an external electronic device connected to the electronic device as the usage pattern of the electronic device.

9. The electronic device of claim 7, wherein the processor is configured to control an external electronic device based on the configuration information associated with the identified context.

10. A method of operating an electronic device, the method comprising:
    executing an application associated with a context;
    displaying a context list including at least one context through the executed application;
    receiving a selection of at least one context from the context list on the basis of a user input;
    displaying a user interface including a button for changing the selected context, a button for selecting configuration information according to the selected context, and a button for adding another context, when at least one context is selected from the context list;
    determining whether a context addition is requested;
    providing a configuration list including at least one piece of configuration information, when the context addition is not requested;
    detecting a selection of at least one piece of configuration information;
    determining whether the addition of configuration information is requested;
    providing a recommendation list including at least one piece of recommendation information, when the addition of configuration information is not requested;
    detecting selection of at least one piece of recommendation information;
    determining whether addition of recommendation information is requested;
    storing user customized information including configuration information or recommendation information according to the selected context in a memory of the electronic device, when the addition of recommendation information is not requested;

identifying a context on the basis of at least one of time, a location, or a usage pattern, wherein the identified context comprises at least two contexts on the basis of the usage pattern or a user's configuration;

providing a notification associated with the identified context;

detecting a user input for selecting the provided notification; and providing configuration information and recommendation information associated with the context based on a user customized list stored in the memory.

11. The method of claim 10, wherein:

when the usage pattern is analyzed, the configuration information indicates a change in a configuration of the electronic device based on the usage pattern; and when the usage pattern is not analyzed, the configuration information indicates a default configuration for the electronic device.

\* \* \* \* \*